US008488847B2

(12) United States Patent
Nozaki et al.

(10) Patent No.: US 8,488,847 B2
(45) Date of Patent: Jul. 16, 2013

(54) ELECTRONIC CAMERA AND IMAGE PROCESSING DEVICE

(75) Inventors: Hirotake Nozaki, Melville, NY (US); Akira Ohmura, Tokyo (JP); Yasuyuki Motoki, Yokohama (JP); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 1204 days.

(21) Appl. No.: 12/085,353

(22) PCT Filed: Nov. 22, 2006

(86) PCT No.: PCT/JP2006/323295
§ 371 (c)(1),
(2), (4) Date: Aug. 19, 2008

(87) PCT Pub. No.: WO2007/060980
PCT Pub. Date: May 31, 2007

(65) Prior Publication Data
US 2009/0135269 A1    May 28, 2009

(30) Foreign Application Priority Data

Nov. 25, 2005 (JP) .................................. 2005-341050
Nov. 25, 2005 (JP) .................................. 2005-341051
Nov. 25, 2005 (JP) .................................. 2005-341052
Nov. 25, 2005 (JP) .................................. 2005-341053
Nov. 25, 2005 (JP) .................................. 2005-341054

(51) Int. Cl.
*G06K 9/00* (2006.01)
*H04N 5/235* (2006.01)

(52) U.S. Cl.
USPC ..................... 382/118; 348/222.1; 348/229.1; 348/240.99

(58) Field of Classification Search
USPC ............... 382/118; 348/207.99, 222.1, 229.1, 348/240.99
See application file for complete search history.

(56) References Cited

U.S. PATENT DOCUMENTS 5,579,078 A * 11/1996 Suzuki ........................... 396/51
5,835,641 A * 11/1998 Sotoda et al. ................. 382/291

(Continued)

FOREIGN PATENT DOCUMENTS

JP          01241511 A  *  9/1989
JP          A 06-259534      9/1994

(Continued)

OTHER PUBLICATIONS

Notification of Reasons for Refusal dated Aug. 16, 2011 in Japanese Application No. 2009-092050 (with translation).

(Continued)

*Primary Examiner* — Jon Chang
(74) *Attorney, Agent, or Firm* — Oliff & Berridge, PLC

(57) ABSTRACT

An image sensor of an electronic camera photoelectrically converts a subject image obtained by a shooting optical system to generate an image signal. A image processing section generates face registration image data and moving image data. A face detecting section detects a face area inside a shooting screen based on the moving image data. A controlling section adjusts shooting parameters of the shooting optical system, depending on a position detected at the face area. A face image generating section cuts out an image of the face area to generate face image data. A face recognizing data generating section extracts feature points of the face of a captured person from a part of the face area of the face registration image data and generates face recognizing data. A recording section records the face recognizing data or face image data.

53 Claims, 16 Drawing Sheets

U.S. PATENT DOCUMENTS

| | | | |
|---|---|---|---|
| 6,882,741 B2* | 4/2005 | Dobashi et al. | 382/118 |
| 6,940,545 B1* | 9/2005 | Ray et al. | 348/222.1 |
| 2004/0136574 A1* | 7/2004 | Kozakaya et al. | 382/118 |
| 2004/0207743 A1 | 10/2004 | Nozaki et al. | |
| 2004/0208114 A1 | 10/2004 | Lao et al. | |
| 2004/0239765 A1 | 12/2004 | Kuromatsu | |
| 2005/0219385 A1 | 10/2005 | Terakawa | |
| 2005/0251015 A1 | 11/2005 | Takikawa et al. | |
| 2007/0002463 A1 | 1/2007 | Shintani et al. | |

FOREIGN PATENT DOCUMENTS

| | | |
|---|---|---|
| JP | A-9-81094 | 3/1997 |
| JP | A 09-163212 | 6/1997 |
| JP | A-10-232934 | 9/1998 |
| JP | A 2001-016573 | 1/2001 |
| JP | A-2001-51338 | 2/2001 |
| JP | A 2002-333652 | 11/2002 |
| JP | A-2003-92699 | 3/2003 |
| JP | A-2003-150603 | 5/2003 |
| JP | A-2003-196655 | 7/2003 |
| JP | A-2003-348438 | 12/2003 |
| JP | A-2004-86625 | 3/2004 |
| JP | A 2004-222118 | 8/2004 |
| JP | A 2004-272933 | 9/2004 |
| JP | A 2004-320287 | 11/2004 |
| JP | A-2005-86516 | 3/2005 |
| JP | A-2005-117532 | 4/2005 |
| JP | A-2005-207110 | 8/2005 |
| JP | A 2005-209137 | 8/2005 |
| JP | A-2005-311888 | 11/2005 |
| JP | A 2007-006033 | 1/2007 |
| JP | A-2007-11200 | 1/2007 |
| JP | A-2007-74141 | 3/2007 |

OTHER PUBLICATIONS

Dec. 6, 2011 Office Action issued in Japanese Patent Application No. 2009-092050 (with translation).

Notification of Reasons for Refusal dated Nov. 24, 2010 in corresponding Japanese Patent Application No. 2005-341051 (with translation).

Satoh, S.; "Name-it: Naming and Detecting Faces in News Videos," *IEEE Multimedia*; Jan. 1, 1999; pp. 22-35; vol. 6, No. 1; IEEE Service Center, New York, New York, USA.

Extended European Search Report issued in European Patent Application No. 06833117.2 on Feb. 2, 2010.

Apr. 24, 2012 Office Action issued in Japanese Patent Application No. 2009-092050 (with translation).

* cited by examiner

ELECTRONIC CAMERA AND IMAGE PROCESSING DEVICE

CROSS-REFERENCE TO RELATED APPLICATION

This application is a U.S. National Stage application claiming the benefit of prior filed International Application Number PCT/JP2006/323295, filed Nov. 22, 2006, in which the International Application claims a priority date of Nov. 25, 2005 based on prior filed Japanese Application Numbers 2005-341050, 2005-341051, 2005-341052, 2005-341053 and 2005-34105, the entire contents of which are incorporated herein by reference.

TECHNICAL FIELD

The present invention relates to an electronic camera and an image processing device which are provided with face recognizing functions of a person.

BACKGROUND ART

Conventionally, there have been disclosed techniques for extracting feature points of the face of a person from a shooting image taken for the face of a person to recognize the face based on how much the face recognizing data with regard to the person to be recognized is in agreement with the above feature points (refer to Patent Document 1). The above-described techniques recognizing the face require registration in advance of the face recognizing data in an electronic camera or the like. In particular, for improving the accuracy of face recognition, more face recognizing data is required. Therefore, it is necessary to generate the face recognizing data from shooting images of a plurality of frames.

Incidentally, in registration shooting for generating the face recognizing data, it is necessary to shoot the face of a subject so as to easily extract feature points of the face. Therefore, there is required an electronic camera, which is provided with a shooting mode capable of performing the above-described registration shooting easily.

Further, on registration of the face recognizing data, it is required to generate the face recognizing data from more shooting image data. If it is possible to generate the face recognizing data, for example, by referring to image data obtained by other electronic cameras and image data obtained in the past, users will benefit greatly in terms of convenience. Further, there is required a measure for allowing an easy face registration without involving complicated and troublesome work in making the face registration.

Still further, in the above-described electronic camera, a plurality of face recognizing data are registered in the memory. Therefore, a user is more likely to have difficulty in managing and editing the thus registered face recognizing data. For example, where the electronic camera is allowed to discriminate a specific registered person by selecting the face recognizing data on shooting or where the face recognizing data on the specific registered person is deleted on editing, it is required that the user can easily and quickly recognize an outline of the face recognizing data and a corresponding relationship of the face recognizing data with the registered person.

Further, an electronic camera having face-recognizing functions is able to customize shooting conditions, image processing or the like depending on the result of face recognition. Now, there is desired an electronic camera capable of controlling functions so as to appropriately reflect the intention of a user even where a plurality of targets to be recognized are shot at once.

Still further, where a plurality of faces are detected inside a shooting screen or where a total number of face recognizing data used in determining of the face recognition is large, an extremely large amount of computations will be required in face recognition processing. In the above case, the face recognition processing requires a long time for computation. Thus, there is still room for improvement in view of the fact that a user is unable to perform shooting easily or more likely to loose a chance of the shooting at the most opportune timing. Patent Document 1: Japanese Unexamined Patent Application Publication No. H06-259534

DISCLOSURE

Problems to be Solved

The present invention is to solve at least one of the problems found in the above techniques. A proposition of the present invention is to provide an electronic camera capable of performing registration shooting easily on generation of face recognizing data.

Another proposition of the present invention is to provide an image processing device capable of reading image data of previously shot persons and easily generating face recognizing data on a target person.

Still another proposition of the present invention is to provide an electronic camera in which a user is able to easily and quickly recognize an outline of the face recognizing data and a corresponding relationship of the face recognizing data with the registered person.

A further proposition of the present invention is to provide an electronic camera capable of controlling the functions so as to appropriately reflect the intention of the user, depending on the result of face recognition, even where a plurality of targets to be recognized are shot at once.

Still a further proposition of the present invention is to provide an electronic camera capable of appropriately adjusting the amount of computation in face recognition processing, depending on the situation.

Means for Solving the Problems

The electronic camera according to a first invention is provided with an image sensor, an image processing section, a face detecting section, a controlling section, a face image generating section or a face recognizing data generating section, and a recording section. The image sensor photoelectrically converts a subject image obtained by a shooting optical system to generate an image signal. The image processing section generates face registration image data based on the image signal from the image sensor and generates moving image data based on the image signal. The face detecting section detects a face area inside a shooting screen based on the moving image data. The controlling section adjusts shooting parameters of the shooting optical system, depending on a position detected at the face area. The face image generating section cuts out an image of the face area to generate face image data. The face recognizing data generating section extracts feature points of the face of a captured person from a part of the face area of the face registration image data to generate face recognizing data based on the feature points. The recording section records the face image data or the face recognizing data.

The electronic camera according to a second invention is provided with an image sensor, an image processing section, a controlling section, a face detecting section, a face image generating section or a face recognizing data generating section, and a recording section. The image sensor photoelectrically converts a subject image obtained by a shooting optical system to generate an image signal. The image processing section generates face registration image data based on the image signal from the image sensor and generates moving image data based on the image signal. The controlling section adjusts shooting parameters obtained by the shooting optical system based on a central part of a shooting screen. The face detecting section detects a face area positioned at the central part of the shooting screen based on the moving image data or the face registration image data. The face image generating section cuts out an image of the face area to generate face image data.

The face recognizing data generating section extracts feature points of the face of a captured person from a part of the face area of the face registration image data to generate face recognizing data based on the feature points. The recording section records the face image data or the face recognizing data.

A third invention is the first invention or the second invention in which the controlling section executes the release operation of the image sensor when the face is detected based on the moving image data.

A fourth invention is any one of the first invention to the third invention, which is additionally provided with a display section for displaying an image of the moving image data. The controlling section turns on power of the display section in a shooting mode generating the face registration image data.

A fifth invention is any one of the first invention to the third invention, which is additionally provided with a display section displaying an image of the moving image data. The image processing section synthesizes a composition assisting display assisting the positioning of the face in the shooting screen and outputs it at the central part of the moving image data.

A sixth invention is the fifth invention, in which the image processing section further synthesizes and outputs a sample display of a subject in a state of shooting into the moving image data.

A seventh invention is any one of the first invention to the sixth invention in which the controlling section restricts a digital zoom processing with respect to the face registration image data on generation of the face registration image data.

An eighth invention is any one of the first invention to the seventh invention in which the shooting optical system is additionally provided with a zoom lens. The controlling section restricts a magnifying power adjustable range of the zoom lens on adjustment of the shooting parameters and at release more than on normal shooting.

A ninth invention is the eighth invention in which the controlling section sets a zoom position of the zoom lens to a wide-angle end at release.

A tenth invention is any one of the first invention to the ninth invention, which is additionally provided with an image blurring correcting lens for correcting image blurring on a shooting screen, an angular displacement detecting section for detecting change in the angle of the optical axis of the electronic camera, and a correcting lens driving section for driving the image blurring correcting lens based on the change in the angle at release.

An eleventh invention is any one of the first invention to the tenth invention, which is additionally provided with an image sensitivity modification section for adjusting gain of the image signal. The controlling section makes greater the gain of the image signal at release than when it is set on normal shooting.

A twelfth invention is any one of the first invention to eleventh invention, which is additionally provided with a flash emitting section which emits flash to a field. The controlling section disables the flash emission by the flash emitting section at release.

A thirteenth invention is any one of the first invention to the twelfth invention in which the controlling section generates shooting condition data indicating shooting conditions at release and records the shooting condition data at the recording section by allowing the data to correspond to the face image data or the face recognizing data.

A fourteenth invention is any one of the first invention to the thirteenth invention in which the controlling section generates acquisition time data indicating time of acquiring the face image data or the face recognizing data and records the acquisition time data at the recording section by allowing the data to correspond to the face image data or the face recognizing data.

A fifteenth invention is any one of the first invention to the fourteenth invention in which the image processing section generates index image data based on the face registration image data. The controlling section records the index image data at the recording section by allowing the data to correspond to the face image data or the face recognizing data.

A sixteenth invention is any one of the first invention to the fifteenth invention in which the controlling section groups a plurality of the face image data or the face recognizing data generated from the same captured person and records the thus grouped data at the recording section.

A seventeenth invention is the sixteenth invention in which the controlling section groups two or more pieces of the face image data or the face recognizing data differ in any one of the direction of the face of a captured person, the presence or absence of glasses of the captured person and shooting conditions of the face registration image data.

An eighteenth invention is any one of the first invention to the seventeenth invention in which the controlling section decides a priority level of the face registration image data based on a state of detecting the face area when a plurality of the face registration image data obtained from the same captured person are generated. The face image generating section or the face recognizing data generating section generates the face image data or the face recognizing data from the face registration image data higher in the priority level.

A nineteenth invention is any one of the first invention to the eighteenth invention in which the controlling section estimates the direction of the face of a captured person based on a state of detecting the face area and disables the release operation of the image sensor when the direction of the face is not in agreement with a predetermined direction.

A twentieth invention is any one of the first invention to the eighteenth invention in which the controlling section estimates an expression of the captured person based on a state of detecting the face area and disables the release operation of the image sensor depending on the type of expression.

The electronic camera according to a twenty-first invention is provided with an image sensor, a face detecting section, a face recognizing data generating section and a controlling section. The image sensor photoelectrically converts a subject image obtained by a shooting optical system to generate an image signal. The face detecting section detects a face area inside a shooting screen based on the image signal from the image sensor. The face recognizing data generating section extracts feature points of the face of a captured person from a part of the face area and generates face recognizing data based on the feature points. The controlling section restricts the shooting conditions on shooting to generate the face recognizing data more than the shooting conditions on normal shooting.

The image processing device of a twenty-second invention is provided with a controlling section, a face detecting section, a face image generating section or a face recognizing data generating section, and a recording section. The controlling section is provided with at least any one of a built-in memory, a connecting section with a recording medium and an external communication unit, thus acquiring shooting image data previously generated by an electronic camera through any one of the built-in memory, the recording medium and a computer coupled via the external communication unit. The face detecting section detects a face area inside a shooting screen based on the shooting image data. The face image generating section cuts out an image of the face area to generate face image data. The face recognizing data generating section extracts feature points of the face of a captured person from a part of the face area of the shooting image data to generate face recognizing data based on the feature points. The recording section records the face image data or the face recognizing data.

A twenty-third invention is the twenty-second invention, which is additionally provided with an image processing section for synthesizing a display discriminating the face area in a reproduced image of the shooting image data and a display section for displaying an output image of the image processing section.

A twenty-fourth invention is the twenty-third invention, which is additionally provided with an input section accepting input by a user. The face detecting section changes a threshold value which specifies a detection accuracy of the face area based on input from the input section.

A twenty-fifth invention is the twenty-third invention, which is additionally provided with an input section accepting input by a user. The face image generating section or the face recognizing data generating section generates the face image data or the face recognizing data on a face area selected by input from the input section when a plurality of face areas are detected from the shooting image data.

A twenty-sixth invention is any one of the twenty-second invention to the twenty-fifth invention in which the controlling section groups a plurality of the face image data or the face recognizing data generated from the same captured person and records the thus grouped data at the recording section.

A twenty-seventh invention is any one of the twenty-second invention to the twenty-sixth invention in which the controlling section cuts out a part of the face area of the shooting image data into a predetermined size to generate index image data and records the index image data at the recording section by allowing the data to correspond to the face image data or the face recognizing data.

A twenty-eighth invention is any one of the twenty-second invention to the twenty-seventh invention in which the shooting image data has an attachment data area at which shooting conditions on shooting are recorded. The controlling section generates shooting condition data based on the shooting conditions of the attachment data area and records the shooting condition data at the recording section by allowing the data to correspond to the face image data or the face recognizing data.

A twenty-ninth invention is any one of the twenty-second invention to the twenty-eighth invention in which the shooting image data has an attachment data area at which shooting date and hour are recorded. The controlling section generates acquisition time data of the face image data or the face recognizing data based on the shooting date and hour of the attachment data area and records the acquisition time data at the recording section by allowing the data to correspond to the face image data or the face recognizing data.

The electronic camera according to a thirtieth invention is provided with an image sensor, a face detecting section, a recording section, a face recognizing section and a controlling section. The image sensor photoelectrically converts a subject image obtained by a shooting optical system to generate an image signal. The face detecting section detects a face area of a shooting screen based on the image signal and extracts feature points of the face of a captured person from a part of the face area. The recording section allows face recognizing data previously generated based on feature points of the face of a person to correspond to index image data indicating a registered person corresponding to the face recognizing data and records them. The face recognizing section determines whether the captured person is the registered person based on the feature points extracted by the face detecting section and the face recognizing data. The controlling section generates an edit screen relating a display item used in specifying the face recognizing data with an image of the index image data and showing the result.

A thirty-first invention is the thirtieth invention in which the index image data is the shooting image data of the registered person.

A thirty-second invention is the thirty-first invention in which the index image data is shooting image data used in generating the face recognizing data.

A thirty-third invention is any one of the thirtieth invention to the thirty-second invention in which shooting conditions of image data used in generating the face recognizing data are recorded at the recording section in a state where they are allowed to correspond to the face recognizing data.

A thirty-fourth invention is any one of the thirtieth invention to the thirty-third invention in which shooting time of image data used in generating the face recognizing data is recorded at the recording section in a state where the shooting time is allowed to correspond to the face recognizing data.

A thirty-fifth invention is any one of the thirtieth invention to the thirty-fourth invention in which process setting applicable in shooting of the registered person is recorded at the recording section in a state where the setting is allowed to correspond to the face recognizing data.

A thirty-sixth invention is any one of the thirtieth invention to the thirty-fifth invention, which is additionally provided with a communicating section transmitting image data of a shooting image externally in which determination on whether the image data is transmitted in shooting of the registered person and address information on a destination of the image data are recorded at the recording section in a state where they are allowed to correspond to the face recognizing data.

A thirty-seventh invention is any one of the thirtieth invention to the thirty-sixth invention in which the controlling section is provided with a personal authentication unit managing determination on whether the edit screen is displayed and output.

A thirty-eighth invention is the thirty-seventh invention in which the personal authentication unit includes face authentication by the face recognizing section.

A thirty-ninth invention is any one of the thirty-first invention to the thirty-eighth invention in which a plurality of the index image data with regard to the same registered person can be recorded at the recording section, and the controlling section selects an image of any given shooting image data from the index image data and relates the selected image with the display item to show results on the edit screen.

A fortieth invention is the thirty-ninth invention in which the controlling section selects an image of the newest shooting image data from the index image data.

A forty-first invention is the thirty-ninth invention in which the controlling section selects an image of the shooting image data on the front of the face of the registered person among the index image data.

A forty-second invention is the thirty-ninth invention in which the controlling section sequentially switches an image of the index image data at every predetermined time interval to show the image on the edit screen.

The electronic camera according to a forty-third invention is provided with an image sensor, a face detecting section, a recording section, a face recognizing section and a controlling section. The image sensor photoelectrically converts a subject image obtained by a shooting optical system to generate an image signal. The face detecting section detects a face area of a shooting screen based on the image signal to extract feature points of the face of a captured person from a part of the face area. The recording section allows face recognizing data previously generated based on feature points of the face of the registered person to correspond to shooting setting applicable in shooting of a registered person and records the data. The face recognizing section determines whether the captured person is the registered person based on feature points extracted by the face detecting section and the face recognizing data. The controlling section sets a priority level of the registered person and generates shooting image data based on the shooting setting in shooting of the registered person, thereby applying the shooting setting corresponding to a registered person having the highest priority level among the registered persons on detection of a plurality of the registered persons.

A forty-fourth invention is the forty-third invention, which is additionally provided with an input section accepting input by a user. Further, the controlling section specifies the registered person based on input from the input section to set the priority level individually.

A forty-fifth invention is the forty-fourth invention, which is additionally provided with a display section displaying an edit screen on which the registered person is specified. Further, the controlling section allows a position or an order of displaying a display item of the registered person on the edit screen to change according to the priority level.

A forty-sixth invention is any one of the forty-third invention to the forth fifth invention in which the controlling section sets the priority level in order of the registration of registered persons.

A forty-seventh invention is any one of the forty-third invention to the forty-fifth invention in which the controlling section arranges the registered persons according to the names to set the priority level.

A forty-eighth invention is any one of the forty-third invention to the forty-fifth invention in which the recording section is able to group a plurality of the face recognizing data with regard to the same registered person and record the thus grouped data, and the controlling section sets the priority level to the thus grouped face recognizing data group according to the number of the face recognizing data included in the face recognizing data group.

A forty-ninth invention is the forty-third invention in which the recording section further records data on the number of shootings indicating the number of shootings for each of the registered persons. Then, the controlling section sets higher the priority level of a registered person having a greater number of shootings based on the data on the number of shootings.

The electronic camera according to a fiftieth invention is provided with an image sensor, a face detecting section, a recording section, a controlling section and a face recognizing section. The image sensor photoelectrically converts a subject image obtained by a shooting optical system to generate an image signal. The face detecting section detects a face area of a shooting screen based on the image signal to extract feature points of the face of a captured person from a part of the face area. The recording section records face recognizing data previously generated based on feature points of the face of a registered person. The controlling section selects determining-purpose face recognizing data from the face recognizing data group based on the number of the face recognizing data included in the face recognizing data group with regard to a registered person to be recognized for the face. The face recognizing section determines whether the captured person is the registered person to be recognized for the face based on the feature points extracted by the face detecting section and the determining-purpose face recognizing data.

A fifty-first invention is the fiftieth invention in which the controlling section selects the determining-purpose face recognizing data in such a manner that an evaluation value corresponding to a product of the number of the face recognizing data and the number of the face areas is below a threshold value specified by the processing capacity of the face recognizing section.

A fifty-second invention is either the fiftieth invention or the fifty-first invention in which the controlling section weights and selects the determining-purpose face recognizing data based on a priority level set for each registered person where a plurality of registered persons to be recognized for the face are available.

A fifty-third invention is any one of the fiftieth invention to the fifty-second invention in which the controlling section selects the determining-purpose face recognizing data, with priority given to a registered person having a greater number of the face recognizing data where a plurality of registered persons to be recognized for the face are available.

A fifty-fourth invention is any one of the fiftieth invention to the fifty-third invention in which the controlling section selects the determining-purpose face recognizing data, with priority given to face recognizing data newer in acquisition time where a plurality of the face recognizing data are recorded with regard to the same registered person.

A fifty-fifth invention is any one of the fiftieth invention to the fifty-fourth invention in which the controlling section selects the determining-purpose face recognizing data, with priority given to face recognizing data which shooting conditions on acquisition are similar to the present shooting conditions where a plurality of the face recognizing data which differ in shooting conditions on acquisition with regard to the same registered person are recorded.

A fifty-sixth invention is any one of the fiftieth invention to the fifty-fifth invention in which the controlling section selects the determining-purpose face recognizing data, with priority given to face recognizing data corresponding to the front of the face where a plurality of face recognizing data which differ in the direction of the face with regard to the same registered person are recorded.

A fifty-seventh invention is any one of the fiftieth invention to the fifty-sixth invention in which the recording section further records data of the number of shootings indicating the number of shootings for each registered person. Then, the controlling section selects the determining-purpose face recognizing data, with priority given to a registered person greater in the number of shootings based on the data of the number of shootings.

In this case, those expressed by converting constitutions of the above inventions to methods, recording media, computer programs or the like are effective as specific aspects of the present invention.

Effects

The electronic camera of one embodiment in the present invention is able to easily carry out registration shooting in generating face recognizing data.

Further, the image processing device of one embodiment in the present invention is able to easily generate the face recognizing data on a target person by reading image data previously obtained by shooting persons.

Still further, the electronic camera of one embodiment in the present invention is able to recognize easily and quickly an outline of the face recognizing data and a corresponding relationship of the face recognizing data with registered persons.

In addition, the electronic camera of one embodiment in the present invention is able to control functions so as to appropriately reflect the intention of a user, depending on the result of face recognition even where a plurality of targets to be recognized are shot at once.

Further, in the electronic camera of one embodiment in the present invention, it is possible to appropriately adjust the amount of computations in face recognition processing, depending on a situation.

DETAILED DESCRIPTION OF THE EMBODIMENTS

Explanation of Embodiment 1

Figure 1:
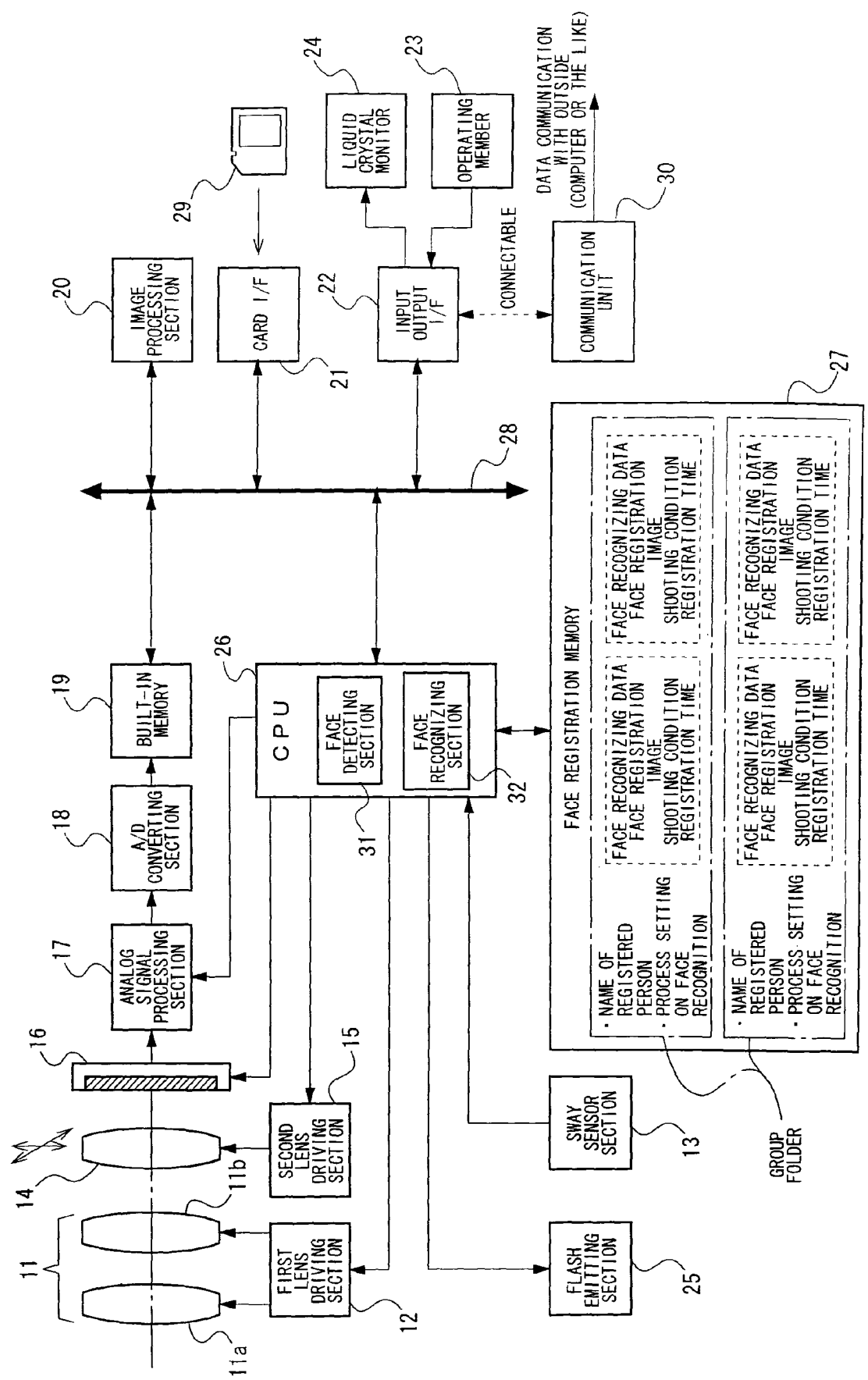
FIG. 1 is a block diagram showing a constitution of an electronic camera of Embodiment 1.

FIG. 1 is a block diagram showing a constitution of an electronic camera of Embodiment 1.

The electronic camera is provided with a shooting optical system 11, a first lens driving section 12, a sway sensor section 13, an image blurring correcting lens 14, a second lens driving section 15, an image sensor 16, an analog signal processing section 17, an A/D converting section 18, a built-in memory 19, an image processing section 20, a card I/F 21, an input output I/F 22, an operating member 23, a liquid crystal monitor 24, a flash emitting section 25, a CPU 26, a face registration memory 27 and a data bus 28. In addition, the built-in memory 19, the image processing section 20, the card I/F 21, the input output I/F 22 and the CPU 26 are coupled each other via the data bus 28.

The shooting optical system 11 is made up of a plurality of lens groups including a zoom lens 11a and a focusing lens 11b for adjusting a focusing position. Each of the lenses making up the shooting optical system 11 is driven and adjusted in an optical axis direction by the first lens driving section 12.

The sway sensor section 13 is provided with a longitudinal angular velocity sensor for detecting a longitudinal sway of an electronic camera and a lateral angular velocity sensor for detecting a lateral sway of the electronic camera. The sway sensor section 13 outputs to the CPU 26 camera sway data indicating the sway of the electronic camera. The camera sway data is used in computing a movement amount of the image blurring correcting lens 14.

The image blurring correcting lens 14 is made up so as to sway at a right angle to the optical axis. The second lens driving section 15 is made up of a longitudinal sway unit for allowing the image blurring correcting lens 14 to sway in the longitudinal direction and a lateral sway unit for allowing the image blurring correcting lens 14 to sway in the lateral direction. The second lens driving section 15 corrects blurring by allowing the image blurring correcting lens 14 to sway based on a movement amount of the image blurring correcting lens 14 computed by the CPU 26.

The image sensor 16 photoelectrically converts light flux passed through the shooting optical system 11 to generate an analog image signal of a subject image. The image sensor 16 exposes a subject at every predetermined time interval on non-release (at the time of shooting stand-by) and outputs an analog image signal (moving image signal) by intermittent read-out. A moving image signal is used in conducting AF computation, AE computation and face detecting operation to be described later or in generating a finder-purpose image.

The analog signal processing section 17 is made up of a CDS circuit for conducting correlated double sampling, a gain circuit for amplifying the output of an analog image signal, a clamp circuit for clamping the waveform of an input signal to a constant voltage level or the like. The A/D converting section 18 converts an analog image signal of the image sensor 16 into a digital image signal. The built-in memory 19 temporarily retains data for pre-processing and post-processing image processing at the image processing section 20. In addition, a recording region capable of recording the shooting image data, which will be described later, is installed at the built-in memory 19.

The image processing section 20 applies a predetermined image processing to a digital image signal. The image processing section 20 generates shooting image data based on image signals at release. Further, the image processing section 20 sequentially generates moving image data based on moving image signals. The moving image data is set to be lower in resolution than the shooting image data. The moving image data is used in face recognition processing by the CPU 26 and also used as a display image of the liquid crystal monitor 24 (preview image). Still further, the image processing section 20 executes compression treatment to the shooting image data. In addition, the image processing section 20 is able to conduct digital zoom processing in which a shooting image is partially cut out to convert the resolution.

Further, the image processing section 20 generates various display video data (such as frame display on face recognition) according to the instructions from the CPU 26 and outputs the video data on the liquid crystal monitor 24 by superimposing the data on the moving image data. Thereby, the above-described various displays are synthesized on the preview image.

The card I/F 21 is provided with a connector for coupling a recording medium 29 formed thereon. The recording medium 29 is made up of a known semiconductor memory or the like. Then, the card I/F 21 controls writing/read-in of shooting image data on the recording medium 29.

The operating member 23 and the liquid crystal monitor 24 are coupled to the input output I/F 22. The operating member 23 is provided with an input button, a release button or the like. The input button of the operating member 23 accepts switching input, for example, shooting modes of an electronic camera (such as normal shooting mode, regeneration mode, face registration mode, and face recognizing shooting mode). Further, the release button of the operating member 23 accepts the designation input of AF operation by half press and release input by full press.

On the other hand, the liquid crystal monitor 24 is in most cases arranged at the back face of an electronic camera. A reproduced image of shooting image data and a setting screen or the like for changing various types of settings of an electronic camera are displayed on the liquid crystal monitor 24. The setting screen includes an edit screen for editing the face recognizing data to be described later. Further, the above preview image can be displayed by animation on the liquid crystal monitor 24 in a shooting mode. Therefore, a user is able to conduct framing of a subject, while confirming the preview image on the liquid crystal monitor 24.

An external connecting terminal is additionally formed at the input output I/F 22. Then, the input output I/F 22 controls data transmitted to or received from a computer or the like coupled via the external connecting terminal in accordance with serial communication specifications of a USB (universal serial bus), the IEEE 1394 or the like. Further, a communication unit 30, which is an expansion device for wireless communications with the outside, can be coupled to the external connecting terminal of the input output I/F 22.

The flash emitting section 25 is made up of a xenon-emitting tube, a main capacitor for storing emission energy, a reflection umbrella and a lens member for effectively applying flash to a subject, a light emission controlling circuit for adjusting light-emitting timing and amount of light or the like.

The CPU 26 controls the operations of each section of an electronic camera in accordance with sequence programs stored in a ROM (not illustrated). The CPU 26 executes, for example, a known contrast-mode AF (automatic focusing) computation based on moving image signals and a known AE (automatic exposure) computation. Further, the CPU 26 computes a movement amount of the image blurring correcting lens 14 based on the camera sway data.

The CPU 26 functions as a face detecting section 31 and a face recognizing section 32 as well. The face detecting section 31, for example, extracts feature points from the moving image data or the shooting image data and detects the face area of a subject, the face size or the like. The face detecting section 31 extracts the face area by feature point extracting processing described in Japanese Unexamined Patent Application Publication No. 2001-16573 or the like. Further, the above feature points include, for example, end points of each of the eyebrows, the eyes, the nose and the lips, contour points of the face, vertex points of the head, and lower end points of the jaw.

The face recognizing section 32 generates face recognizing data based on the feature points of the face detected in a "face registration mode." The face recognizing section 32, for example, generates the face recognizing data of a registered person by referring to the positions of feature points of the detected face, the sizes of face parts determined by the feature points, relative distances between individual feature points or the like.

Further, the face recognizing section 32 conducts face recognition processing for determining whether the face of a person inside a shooting screen is the face of the registered person given in the face recognizing data in the "face recognizing shooting mode." More specifically, first, the face recognizing section 32 computes the positions of feature points of the face of a captured person, the size of each face part, relative distances between individual feature points or the like based on the feature points of the detected face. Next, the face recognizing section 32 compares the above computed results with the face recognizing data to determine the degree of resemblance between the face of a predetermined registered person and that of a captured person. Then, the face recognizing section 32 determines that the captured person is in agreement with the registered person where the degree of resemblance is higher than a threshold value.

In addition, the CPU 26 is able to change the shooting conditions or the setting of image processing and execute a release designation to the image sensor 16 based on the result of the face recognition processing.

The face recognizing data generated by the face recognizing section 32 of the CPU 26 is recorded in the face registration memory 27. The face registration memory 27 is provided with a group folder for each registered person. The face recognizing data covering each of the registered persons is individually recorded in the group folder. In other words, the face recognizing data in the face registration memory 27 is grouped by the group folder for each of the registered persons. For example, it is possible to record in the group folders a plurality of face recognizing data different in the direction of the face, the presence or absence of glasses and the shooting conditions with regard to the same registered person. Then, the registered person is specified by the CPU 26 being able to read out all at once the face recognizing data inside the group folders from the face registration memory 27.

Further, the face registration memory 27 records data on the "name of registered person" and "processing setting on face recognition." The "name of registered person" and the "processing setting on face recognition" are allowed to respectively correspond to the group folder of each of the registered persons.

In this case, the "processing setting on face recognition" records settings of various types of controls applicable to an electronic camera when a registered person is recognized. For example, the "processing setting on face recognition" includes (1) shooting setting conditions on shooting, (2) setting of image processing for shooting image data, (3) setting of recording destination of shooting image data, (4) setting of print specification for shooting image data, and (5) transmission setting of shooting image data.

The above-described shooting setting conditions (1) include an exposure correction value on shooting of each registered person and setting of field depth (selection of low or normal depth). A setting is also possible where the CPU 26 performs shooting automatically on detection of a registered person. The setting of image processing (2) includes setting of the presence or absence of soft focusing processing of the shooting image data and setting of reduced edge reinforcement.

In the setting of recording destination (3), a directory path of the record folder inside the recording medium 29, which acts as a recording destination of the shooting image data, can be specified for each registered person. In other words, the CPU 26 is able to record the shooting image data in a record folder different for each registered person by referring to data in the face registration memory 27.

In the setting of printing specification (4), for example, the presence or absence of print specification for shooting image data by the standard such as DPOF (Digital Print Order Format) can be specified for each registered person. Further, in the transmission setting (5), it is possible to specify a necessity for transmitting the shooting image data in shooting of a registered person and address information on a destination (electronic mail address).

Still further, the face registration memory 27 records data on "face registration image," "registration time of face recognizing data" and "shooting conditions on acquisition of face recognizing data." The data on "face registration image," "registration time of face recognizing data" and "shooting conditions on acquisition of face recognizing data" are allowed to respectively correspond to individual face recognizing data inside the group folder.

The above-described "face registration image" is shooting image data on acquisition of face recognizing data and resized into a predetermined pixel size. Then, the "face registration image" is displayed on an edit screen by the liquid crystal monitor 24. In other words, the "face registration image" functions as an index image for increasing discrimination and retrieval properties of a registered person or face recognizing data. For example, a user is able to confirm on the edit screen by referring to the "face registration image" from whose image and what kind of image (the front or lateral side of the face) the face recognizing data is generated.

The "registration time of face recognizing data" is data on the shooting date and hour of face registration image data, which is an original of the face recognizing data concerned. Further, "shooting conditions on acquisition of face recognizing data" is data on shooting conditions of face registration image data. The shooting conditions include, for example, data on focal length of the shooting optical system 11, white balance and exposure conditions on shooting, and the presence or absence of flash emission on shooting. In addition, data on "registration time of face recognizing data" and "shooting conditions on acquisition of face recognizing data" is also used in determining a case where the face recognizing data used by the CPU 26 in face recognition processing is narrowed down.

Further, the face registration memory 27 records data on the number of shootings indicating the number of shootings for each registered person. The number of shootings of data on the number of shootings is incremented according to the result of face recognition by the CPU 26 in the face recognizing shooting mode. In addition, a user may manually input the number of shootings on the edit screen.

Hereinafter, an explanation will be made for operations of the electronic camera of Embodiment 1 by dividing into a "face registration mode" and a "face recognizing shooting mode."

(Operations in Face Registration Mode)

Figure 2:
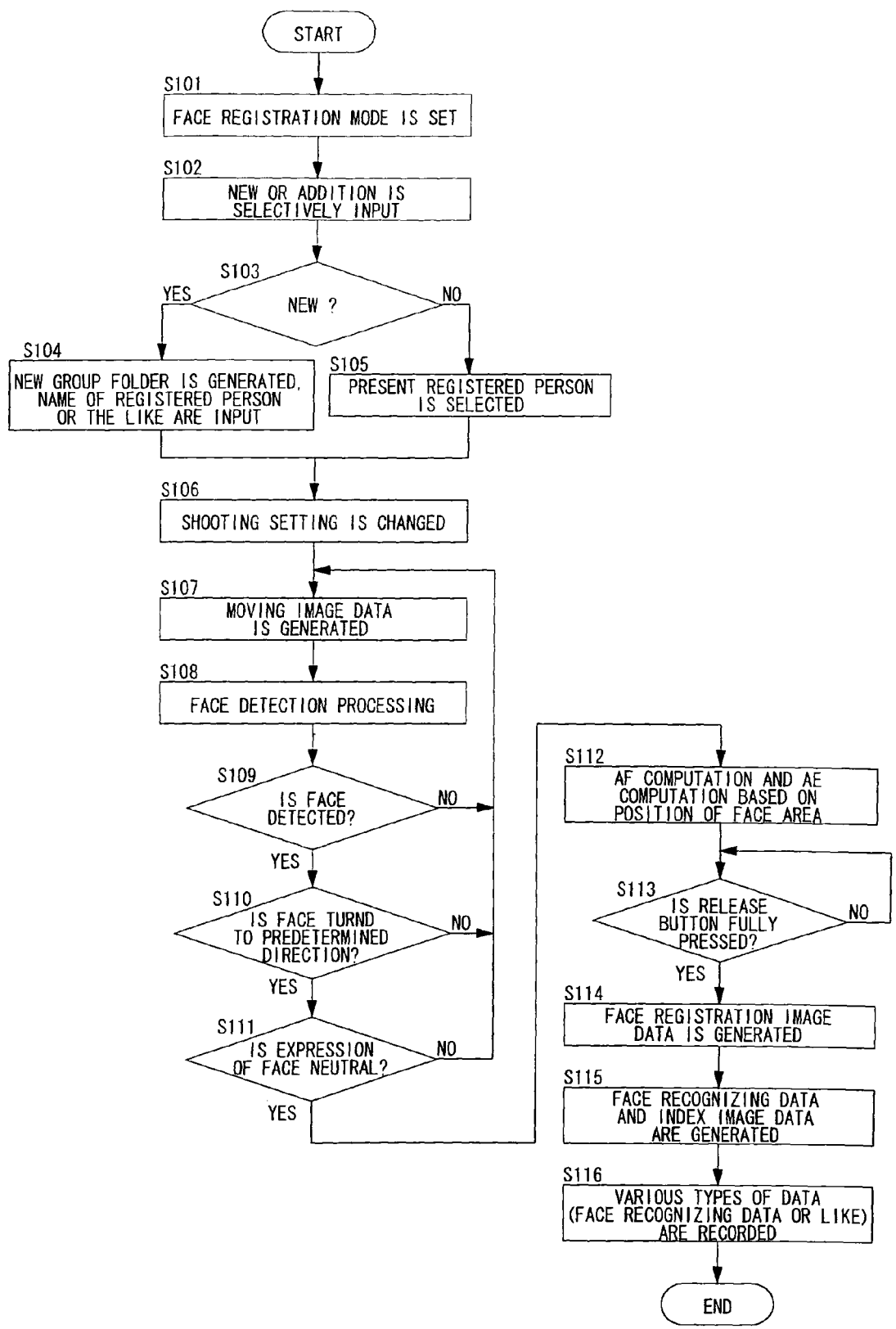
FIG. 2 is a flow chart showing the operations of Embodiment 1 in a "face registration mode".

FIG. 2 is a flow chart showing the operations of Embodiment 1 in a "face registration mode." The "face registration mode" is a type of shooting mode with which a user can shoot the face of a registered person to generate face recognizing data.

Operation S101: First, the user sets a shooting mode of the electronic camera to a "face registration mode" by using the operating member 23.

For example, in a state where an electronic camera is set in a "normal shooting mode" or a "portrait shooting mode," a user operates to bring up a mode selection screen. Thereby, the CPU 26 displays the mode selection screen (refer to FIG. 3(*a*)) on the liquid crystal monitor 24. Then, the user operates a selection frame on the mode selection screen by using the operating member 23, thereby designating the CPU 26 to actuate a "face registration mode." Accordingly, the CPU 26 starts to conduct a series of operations in the "face registration mode."

Operation S102: The CPU 26 displays a menu for the "face registration mode" on the liquid crystal monitor 24 (refer to FIG. 3(*b*)). In the menu, a user operates a selection frame by using the operating member 23 to selectively input "new" or "addition" into the CPU 26. Where the face of a new person is registered, the user selectively inputs "new." On the other hand, where the face of the person who has already been registered is additionally shot, the user selectively inputs "addition."

Operation S103: The CPU 26 determines whether "new" is selected on the menu (S102). Where "new" is selected (where YES), the CPU 26 proceeds to S104. On the other hand, where "addition" is selected (where NO), the CPU 26 proceeds to S105.

Operation S104: Where "new" is selected in S102, the CPU 26 generates a group folder of a newly registered person (a registered person to be shot this time) in the face registration memory 27. Then, the CPU 26 displays "detailed information screen of registered person" (refer to FIG. 5) on the liquid crystal monitor 24, prompting a user to input information on the "name of registered person" and "processing setting on face recognition."

Figure 5:
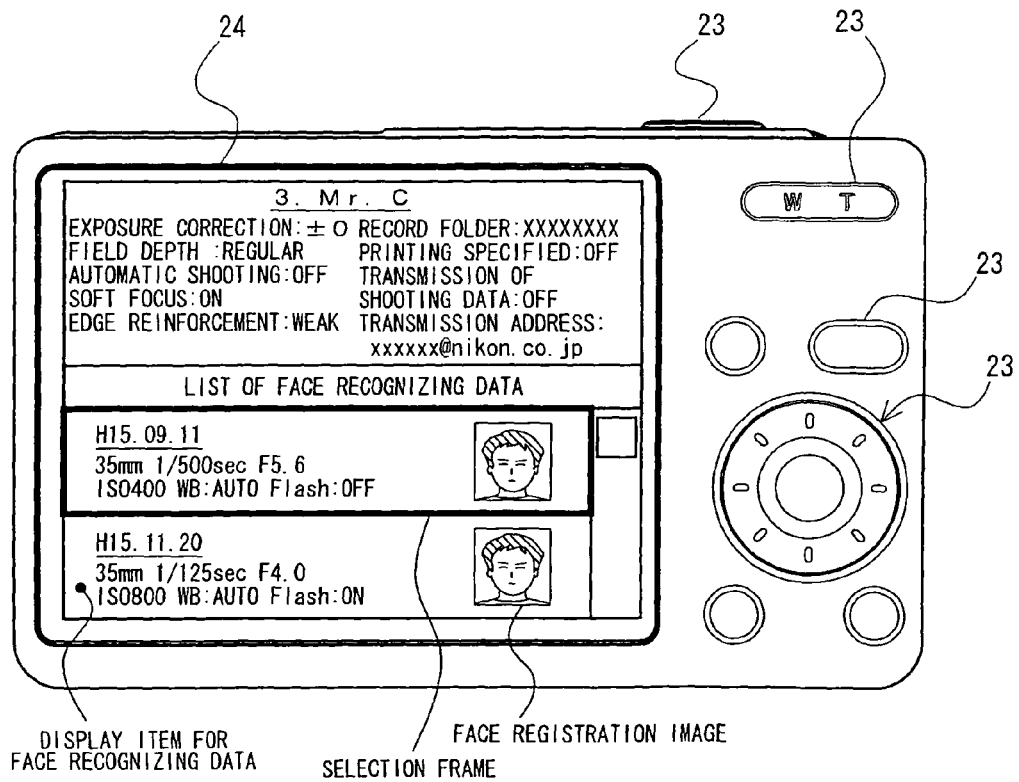
FIG. 5 is a drawing showing one example of a detailed information screen of the registered person.

The information input on "detailed information screen of registered person" in FIG. 5 is recorded in the face registration memory 27 in a state where the information is allowed to correspond to the group folder. Thereafter, the CPU 26 proceeds to S106.

Figure 3:
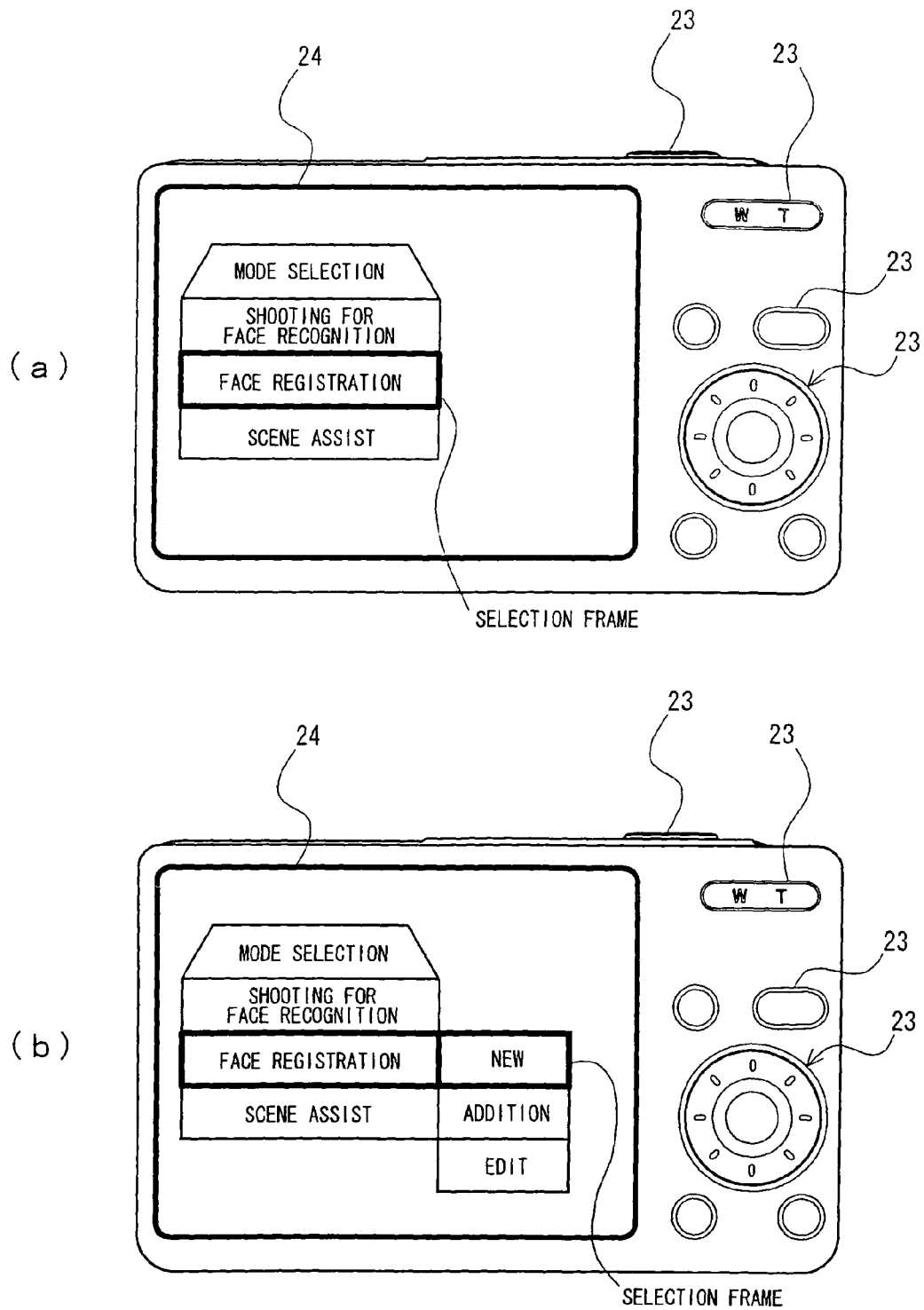
FIGS. 3(a) and 3(b) are drawings each showing one example of a mode selection screen.

In addition, a user is able to omit the input of the "name of registered person" and "processing setting on face recognition." In this case, the user is able to start up "detailed information screen of registered person" in FIG. 5 from an item of editing in FIG. 3(*b*) and again input the information into the face registration memory 27 later.

Operation S105: On the other hand, where "addition" is selected in S102, the CPU 26 displays a selection screen of registered person (refer to FIG. 4) on the liquid crystal monitor 24 and allows the user to selectively input a registered person to be shot this time.

Operation S106: The CPU 26 changes a setting on shooting by an electronic camera to a setting appropriate for face registration shooting. More specifically, the CPU 26 provides the following settings of (1) to (7).

(1) The CPU 26 sets an AF mode to a face detection mode in the "face registration mode." In this case, the CPU 26 automatically repeats focusing on a detected face area by referring to the moving image data irrespective of the operation of the release button. Thereby, it is possible to focus on the thus detected face. In addition, the CPU 26 may lock an AF operation when a user half-presses the release button.

(2) The CPU 26 sets the AE mode to a spot AE mode based on a face detecting area in the "face registration mode." In this case, the CPU 26 executes AE computation, focusing on a detected face area by the moving image data. Thereby, the thus detected face can be optimally exposed.

(3) The CPU 26 disables digital zoom processing of the image processing section 20 in the "face registration mode." Alternatively, the CPU 26 restricts the maximum magnification on digital zoom so as to be lower than on normal shooting by restricting magnifications on digital zoom to about two times, for example. This is because when digital zoom is conducted, information on face registration images obtained is decreased to result in a lower accuracy of extracting feature points of the face.

(4) The CPU 26 reduces the maximum magnification in the "face registration mode" by narrowing a magnifying power adjustable range of a zoom lens 11a to the wide angle side to an extent more than on normal shooting. This is because on detection of the face, there is an increased possibility in detecting the face when the zoom lens is set at the wide angle side to make a field depth great. Further, where the zoom lens is set at the wide angle side, there is a decreased possibility of a shooting image being blurred by camera shake. In this case, it is particularly preferable that the zoom lens 11a is fixed at the wide-angle end to make the field depth greater.

Incidentally, when an aperture (not illustrated) of a shooting optical system is narrowed down, the field depth is made great. However, in this case, shooting time corresponding to shutter second is made longer to increase the possibility of a face registration image being blurred by camera shake. Therefore, in view of avoiding the image blurring, it is more preferable that the CPU 26 sets the aperture to the opening side as much as possible. In addition, the CPU 26 may control the system so as to make the field depth gradually greater where the face cannot be detected.

(5) The CPU 26 makes in the "face registration mode" an optical correction by allowing the image blurring correcting lens 14 to move based on output of the sway sensor section 13. This is because of the avoidance of failure in shooting a face registration image resulting from image blurring by camera shake.

(6) The CPU 26 performs a higher gain setting for image signals (setting of image sensitivity) to the analog signal processing section 17 in the "face registration mode" than on normal shooting. This is because when the image sensitivity is made higher, the shooting time is made shorter to decrease the possibility of a face registration image being blurred by camera shake.

(7) The CPU 26 disables flash emission by the flash emitting section 25 in the "face registration mode." This is because when the flash emission is emitted on shooting, there is developed a shadow on the face of a captured person to decrease the accuracy of detecting the face. In addition, where the shooting is performed forcibly in a state where a field is dark to result in a failure in securing a sufficient exposure or where face recognizing data on flash emission is intentionally acquired, the CPU 26 may allow the flash emitting section 25 to emit flash exceptionally.

Operation S107: The CPU 26 drives the image sensor 16 to acquire a moving image signal. The image sensor 16 outputs the moving image signal at every predetermined time interval by an intermittent readout. The image processing section 20 generates moving image data based on the moving image signal. Then, a preview image is displayed by animation on the liquid crystal monitor 24 based on the moving image data.

Operation S108: On the other hand, the face detecting section 31 of the CPU 26 applies known face detection processing to the moving image data, thereby detecting a face area inside a shooting screen.

Further, in S108, it is preferable that the face detecting section 31 decreases a threshold value, which specifies the accuracy of detecting a face area (accuracy rate of the face) and sets a higher detection rate of candidate faces than usual. This is because there is a case where a face registration image may be taken, with the face kept in a direction difficult in detecting the face (for example, the face turned to the side).

Figure 6:
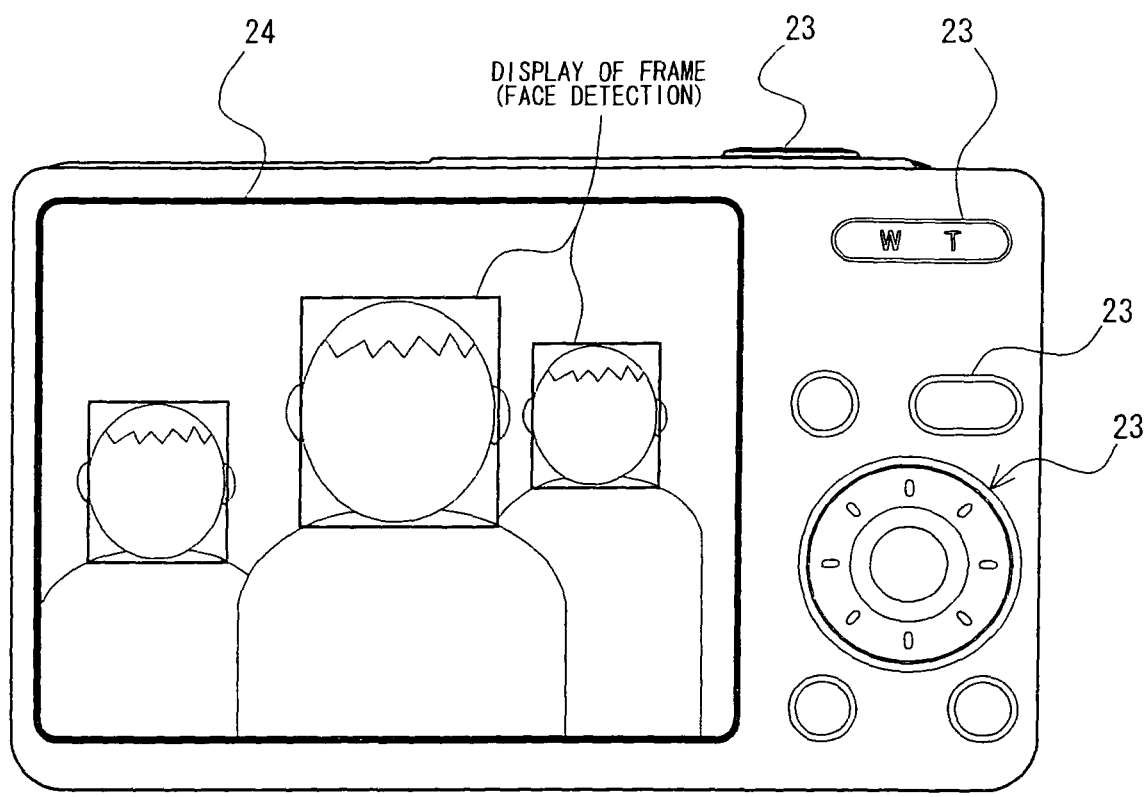
FIG. 6 is a drawing showing a display example of a preview image on face detection.

In addition, where the face detecting section 31 detects the face of a person inside the shooting screen, the image processing section 20 synthesizes and displays a rectangular frame at a position of the face area of a preview image (refer to FIG. 6). Thereby, a user is able to confirm the presence or absence of face detection by referring to the preview image.

Operation S109: The CPU 26 determines whether the face is detected from a shooting screen in S108. Where the face is detected (where YES), the CPU 26 proceeds to S110. On the other hand, where the face is not detected (where NO), the CPU 26 returns to S107.

Operation S110: The CPU 26 estimates a direction of the face based on a state of detecting feature points of the face in a face area. Then, the CPU 26 determines whether the thus estimated direction of the face is in agreement with a predetermined direction of the face (the front or side of the face). Where the face is in the predetermined direction (where YES), the CPU 26 proceeds to S111. On the other hand, where the face is not in the predetermined direction (where NO), the CPU 26 returns to S107. In this case, the CPU 26 may allow the liquid crystal monitor 24 or the like to display a warning message such as "change the direction of the face of a subject and shoot again."

In this case, the direction of the face in S110 is detected by using a known measure. For example, as disclosed in Japanese Unexamined Patent Application Publication No. H09-163212, the CPU 26 may detect a contour of the face and coordinates of the nose by referring to a face image to calculate the direction of the face. Alternatively, as disclosed in Japanese Unexamined Patent Application Publication No. 2005-209137, the CPU 26 may discriminate the direction of the face based on an image database in which face images are classified and registered for each direction of the face.

Where NO in S110, the CPU 26 will not conduct the release operation and no shooting is performed until a subject turns to a different direction. Therefore, it is possible to generate face recognizing data from face registration images covering the face turned to a predetermined direction.

Operation S111: The CPU 26 estimates an expression of the face based on a state of detecting feature points of the face in a face area. Then, the CPU 26 determines whether the expression of the thus estimated face is in a neutral state (in a normal state where no eyes are closed). Where the expression of the face is neutral (where YES), the CPU 26 proceeds to S112. On the other hand, where the expression of the face is not neutral (where NO), the CPU 26 returns to S107. In this case, the CPU 26 may allow the liquid crystal monitor 24 or the like to display a warning message such as "change the expression of the face of a subject and shoot again."

In this case, the expression of the face in S111 is detected by using a known measure. For example, as disclosed in Japanese Unexamined Patent Application Publication No. 2004-272933, learning-purpose face images classified into categories such a normal expression, the face with the eyes closed, the face with the mouth open and the smiling face are prepared in advance, and the CPU 26 may make discrimination by canonical discriminant analysis to determine the expression of the face by referring to an evaluation value set for each category.

Alternatively, standard patterns such as the face with the eyes open, the face with the eyes closed, the face with the mouth open and the face with the mouth closed are prepared in advance, and the CPU 26 may determine how much each of the patterns match with a face area to estimate the expression by referring to a combination of the patterns.

Where NO in S111, the CPU 26 will not conduct release operation and no shooting is performed until a subject changes an expression of the face. Therefore, it is possible to acquire more securely a face registration image in a state where the expression of the face is neutral. This is because face registration images covering neutral expressions are considered to be the most appropriate for face recognition. When the face recognizing data is generated from such an image in a state of the smiling face or the face with the eyes closed, there may be a great reduction in the accuracy of face recognition.

In addition, the CPU 26 may omit the processing in S110 and S111 depending on a setting made by a user.

Operation S112: The CPU 26 executes AF computation and AE computation based on a position detected at a face area.

Operation S113: The CPU 26 determines whether the release button is fully pressed. Where the release button is fully pressed (where YES), the CPU 26 proceeds to S114. On the other hand, where no input is given to the release button (where NO), the CPU 26 stands ready for an operation in which the release button is fully pressed.

Operation S114: The CPU 26 drives the image sensor 16 to shoot a subject image. Thereafter, the image processing section 20 generates shooting image data (face registration image data) based on an image signal at release.

Operation S115: The face recognizing section 32 of the CPU 26 generates face recognizing data of a registered person from the face registration image data (S114). Further, the image processing section 20 trims a face area of the face registration image data and resizes it into a predetermined size by resolution conversion to generate index image data.

Operation S116: The CPU 26 records the shooting condition and the shooting date and hour for face recognizing data, index image data and face registration image data in the face registration memory 27. Each of the above-described data is recorded in a group folder of a registered person specified in S104 or S105 in a state where it is allowed to correspond individually. Of the above data, the index image data corresponds to "face registration image." Further, the shooting conditions correspond to "registration time of face recognizing data" and the shooting conditions correspond to "shooting conditions on acquisition of face recognizing data."

As described so far, a series of operations in the "face registration mode" are completed. In addition, CPU 26 may further continue to register the face recognizing data of a registered person by returning to S107 after S116.

Hereinafter, an explanation will be made for the effects of "face registration mode" in Embodiment 1. In the face registration shooting, a setting on shooting is changed to a setting appropriate for face registration, and AF computation and AE computation are made based on a position detected at the face area (S106, S112). Then, face recognizing data is generated based on face registration image data taken for the face of a person (S114, S115). Therefore, a user is able to easily acquire the face recognizing data based on an appropriately shot face registration image only by releasing an electronic camera for a person whom the user desires to register.

(Operations in Face Recognizing Shooting Mode)

Figure 7:
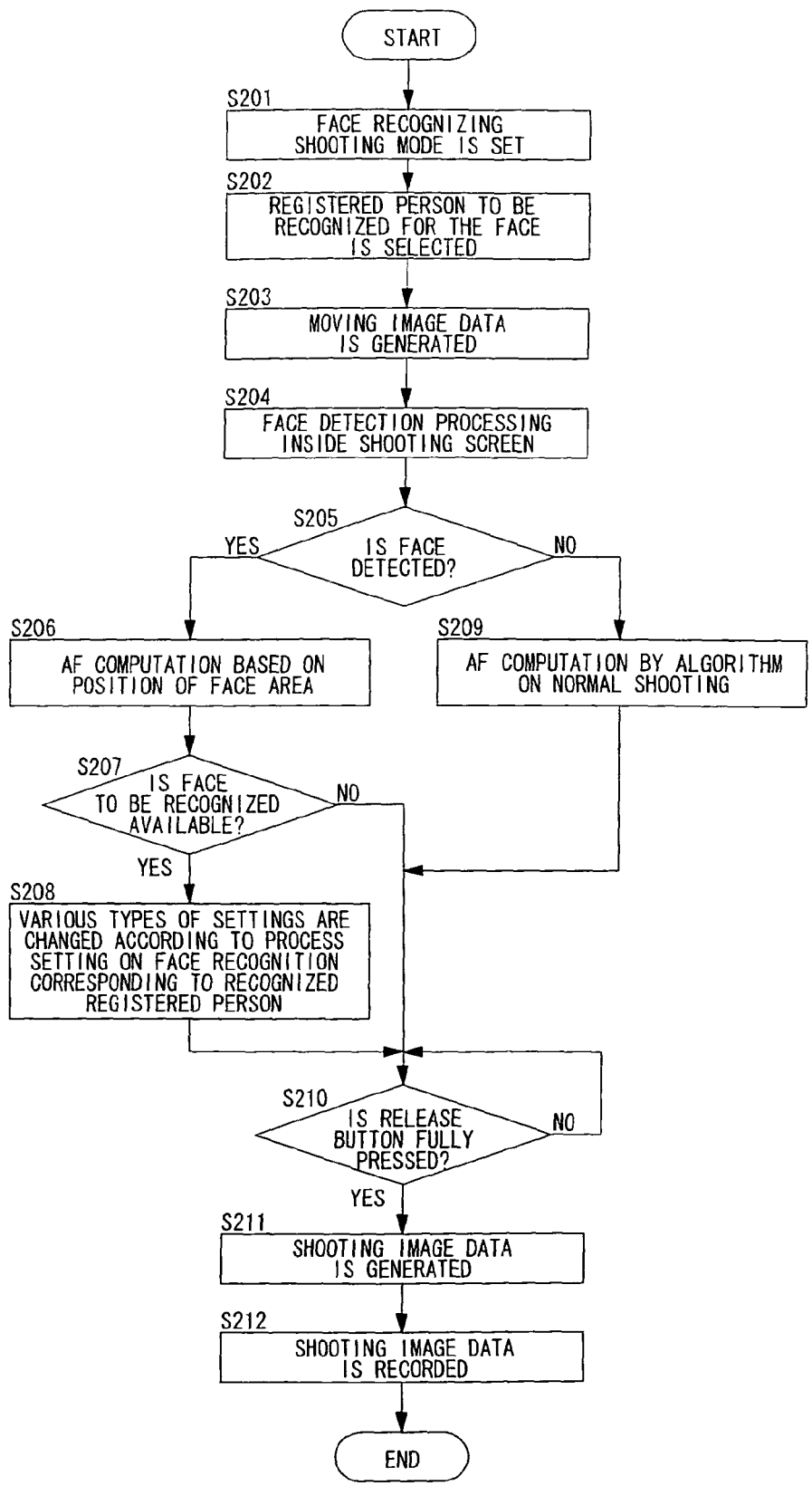
FIG. 7 is a flow chart showing the motions of Embodiment 1 in a "face recognizing shooting mode".

FIG. 7 is a flow chart showing the operations of Embodiment 1 in a "face recognizing shooting mode." The "face recognizing shooting mode" is a shooting mode in which an electronic camera performs a predetermined control to acquire shooting image data where a specified registered person is present on a shooting screen.

Operation S201: First, a user sets a shooting mode of the electronic camera to a "face recognizing shooting mode" by using the operating member 23.

For example, in a state where the electronic camera is set in a "normal shooting mode" or a "portrait shooting mode," a user operates to bring up a mode selection screen. Thereby, the CPU 26 displays the mode selection screen (refer to FIG. 3(*a*)) on the liquid crystal monitor 24. Then, the user operates a selection frame on the mode selection screen by using the operating member 23 and designates the CPU 26 to actuate the "face recognizing shooting mode." Thereby, the CPU 26 starts a series of operations in the "face recognizing shooting mode."

Operation S202: The CPU 26 displays a selecting screen of a registered person (refer to FIG. 4) on the liquid crystal monitor 24. Then, the CPU 26 accepts the specified input of a registered person to be recognized for the face (a registered person whose face is recognized on shooting). In addition, the registered person to be recognized for the face may be specified and input into the CPU 26 by a user before the shooting.

In this case, the CPU 26 is able to accept one or two or more of the specified registered persons on a "selecting screen of registered person." For example, the CPU 26 is able to accept all specified registered persons in the face registration memory 27. Further, a group folder is in advance linked according to predetermined categories (such as family and type of group activities) and a user specifies and inputs a category on the selecting screen, thus making it possible to specify and input all the registered persons linked to the CPU 26 at once.

Operation S203: The CPU 26 drives the image sensor 16 to acquire a moving image signal. The image sensor 16 outputs the moving image signal at every predetermined time interval by an intermittent readout. The image processing section 20 generates moving image data based on the moving image signal. Then, a preview image is displayed by animation on the liquid crystal monitor 24 based on the moving image data.

Operation S204: On the other hand, the face detecting section 31 of the CPU 26 detects a face area inside a shooting screen by applying known face detection processing to the moving image data.

Operation S205: The CPU 26 determines in S204 whether the face is detected from the shooting screen. Where the face is detected (where YES), the CPU 26 proceeds to S206. On the other hand, where the face is not detected (where NO), the CPU 26 proceeds to S209.

Operation S206: The CPU 26 executes AF computation based on a position of the thus detected face area. In addition, where a plurality of face areas are detected, the CPU 26 executes the AF computation, with priority given to a face area positioned at the center of the shooting screen or a face area positioned in the closest proximity.

Operation S207: The face recognizing section 32 of the CPU 26 executes face recognition processing with respect to the thus detected face area (S204). Then, the face recognizing section 32 determines whether a face to be recognized (S202) is included. Where the face to be recognized is included (where YES), the CPU 26 proceeds to S208. On the other hand, where the face to be recognized is not included (where NO), the CPU 26 proceeds to S210.

Operation S208: The CPU 26 changes the shooting setting condition of the electronic camera or a setting of image processing based on data of the "processing setting on face recognition" corresponding to the thus detected registered person. Thereafter, the CPU 26 proceeds to S210.

In this case, where a plurality of faces to be recognized are detected inside the shooting screen, the CPU 26 determines a priority level of registered persons by referring to a predetermined algorithm. Then, the CPU 26 changes various settings of the electronic camera based on the "processing setting on face recognition" corresponding to a registered person having the highest priority level. In addition, where a registered person is set to be automatically shot by the "processing setting on face recognition," the CPU 26 proceeds to S211 and automatically shoots the registered person.

Operation S209: On the other hand, in this case, the CPU 26 selects an AF area by referring to an algorithm on normal shooting in response to the release button half-pressed by a user to execute AF computation.

Operation S210: The CPU 26 determines whether the release button is fully pressed. Where the release button is fully pressed (where YES), the CPU 26 proceeds to S211. On the other hand, where no input is given to the release button (where NO), the CPU 26 stands ready for an operation in which the release button is fully pressed.

Operation 5211: The CPU 26 drives the image sensor 16 to shoot a subject image. Thereafter, the image processing section 20 generates shooting image data based on an image signal at release. In addition, where a face to be recognized is shot, the image processing section 20 applies image processing set by S208 to the shooting image data.

Operation S212: The CPU 26 records the shooting image data on a recording medium 29. In addition, where the face to be recognized is shot, the CPU 26 is also able to classify the shooting image data into a predetermined record folder based on a directory path specified by the face registration memory 27 and records it. As described so far, a series of operations in the "face recognizing shooting mode" are completed.

Hereinafter, an explanation will be made for the effects of the present embodiment in a "face recognizing shooting mode." In the above-described face recognizing shooting mode, a captured person is recognized for the face based on the face recognizing data (S207). Then, where a face to be recognized is detected, various types of processing on shooting are set so as to correspond to the registered person concerned (S208, S211 and S212). Therefore, it is possible to automatically conduct such processing that reflects the intention of a user when shooting the registered person, thereby giving a great convenience to the user who uses an electronic camera.

Explanation of Embodiment 2

Figure 8:
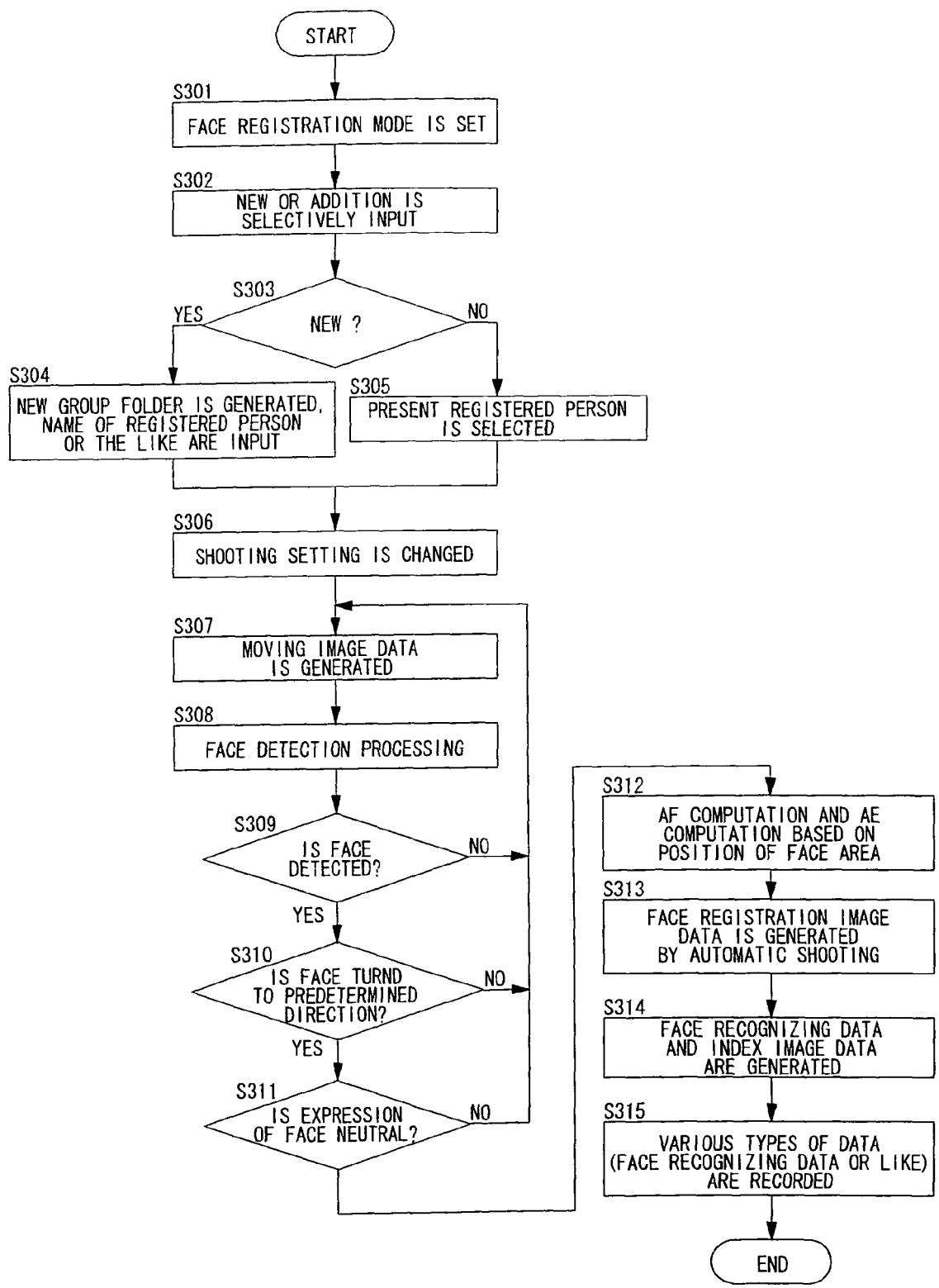
FIG. 8 is a flow chart showing the operations of Embodiment 2 in a "face registration mode".

FIG. 8 is a flow chart showing the operations of Embodiment 2 in the "face registration mode." In addition, since S301 to S312 in FIG. 8 respectively correspond to S101 to S112 in FIG. 2, and S315 in FIG. 8 corresponds to S116 in FIG. 2, the explanation of which will be omitted here for avoiding overlapping description.

Operation S313: The CPU 26 conducts an automatic release operation after completion of AF, driving the image sensor 16 to shoot a subject image. Thereafter, the image processing section 20 generates shooting image data (face registration image data) based on an image signal at release.

Operation S314: The face recognizing section 32 of the CPU 26 generates the face recognizing data of a registered person from the face registration image data (S313). Further, the image processing section 20 generates index image data from the face registration image data.

Hereinafter, an explanation will be made for the effects of Embodiment 2 in the "face registration mode." In Embodiment 2, the face of a person is automatically shot on detection of the face to generate the face recognizing data (S313, S314). Therefore, a user is able to easily acquire the face recognizing data based on an appropriate face registration image only by pointing an electronic camera to a person whom the user desires to register. In particular, in Embodiment 2, focusing and release are automatically conducted, thus making it possible to shoot for face registration by the user alone by pointing a shooting optical system at himself or herself.

Explanation of Embodiment 3

Figure 9:
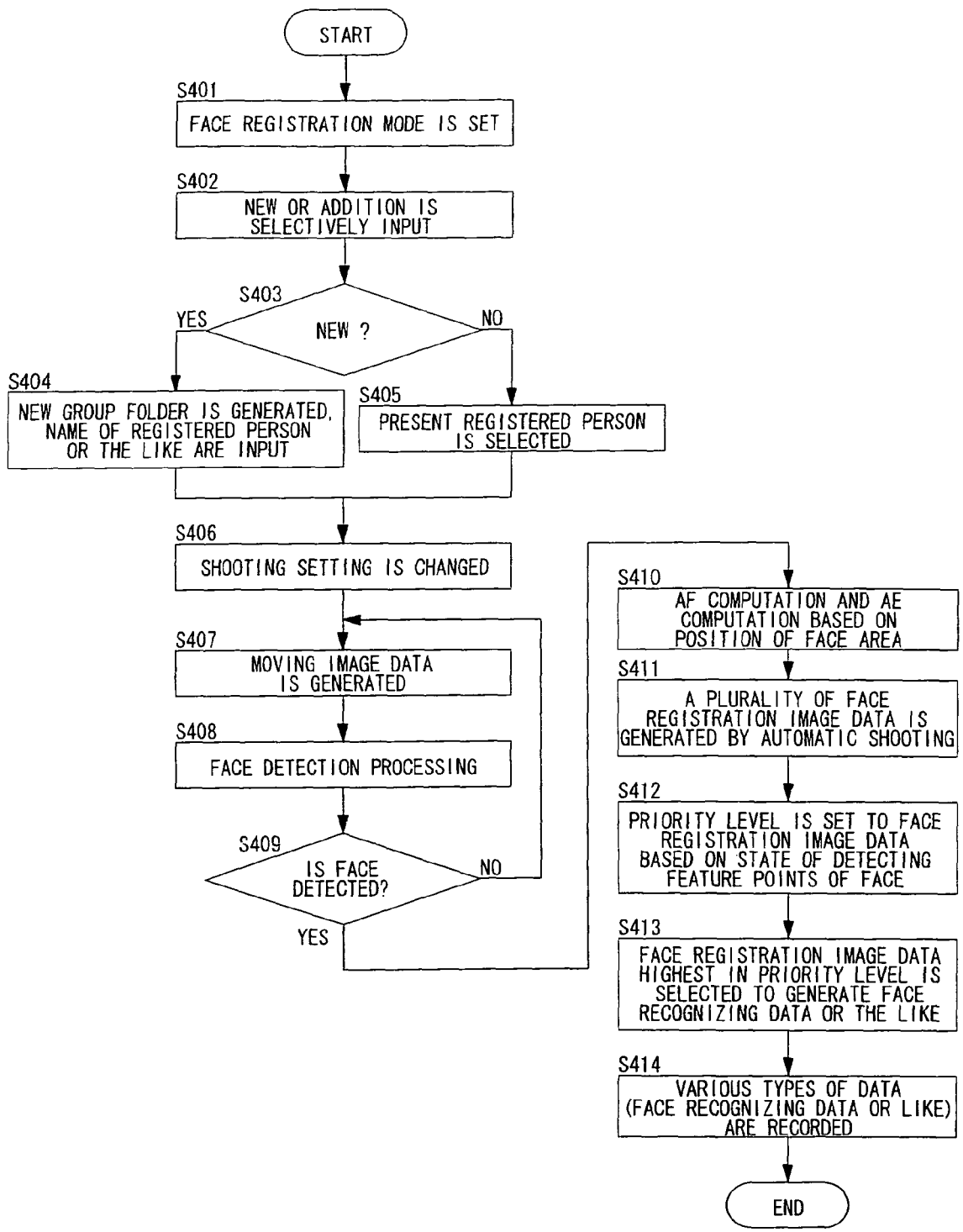
FIG. 9 is a flow chart showing the operations of Embodiment 3 in a "face registration mode".

FIG. 9 is a flow chart showing the operations of Embodiment 3 in the "face registration mode." In addition, since S401 to S409 in FIG. 9 respectively correspond to S101 to S109 in FIG. 2, and S414 in FIG. 9 corresponds to S116 in FIG. 2, the explanation of which will be omitted here for avoiding overlapping description.

Operation S410: The CPU 26 executes AF computation and AE computation based on a position of the thus detected face area.

Operation S411: The CPU 26 continues to carry out automatically a predetermined number of release operations to acquire a plurality of shooting image data (face registration image data). In this case, in S411, the CPU 26 shoots a plurality of the face registration image data, with the shooting conditions made all the same. This is because, a different image is shot under the same shooting conditions, for example, where a subject is not still or there is found an image blurring by camera shake. The CPU 26 may carry out blanketing shooting by changing parameters such as exposure conditions and white balance in a stepwise manner.

Operation S412: The face detecting section 31 of the CPU 26 applies face detection processing individually to a plurality of face registration image data acquired in S411, thereby extracting feature points. Then, the CPU 26 sets a priority level to each of the face registration image data that feature points of the face are detected favorably (in the order greater in the number of extracted feature points, for example). In addition, as shown in S110 or S111 of Embodiment 1, the CPU 26 may set the above priority level, with the direction of the face or facial expressions of the face registration image data taken into account.

Operation S413: The CPU 26 selects the face registration image data, which is the highest in priority level from a plurality of the face registration image data acquired in S411. Then, the face recognizing section 32 of the CPU 26 generates the face recognizing data from the thus selected face registration image data. Further, the image processing section 20 generates index image data from the thus selected face registration image data.

Hereinafter, an explanation will be made for the effects of Embodiment 3 in the "face registration mode." In Embodiment 3, the most appropriate image is selected from a plurality of the face registration image data to generate the face recognizing data. Therefore, according to Embodiment 3, the face recognition can be made at improved accuracy on face recognition shooting.

Explanation of Embodiment 4

Figure 10:
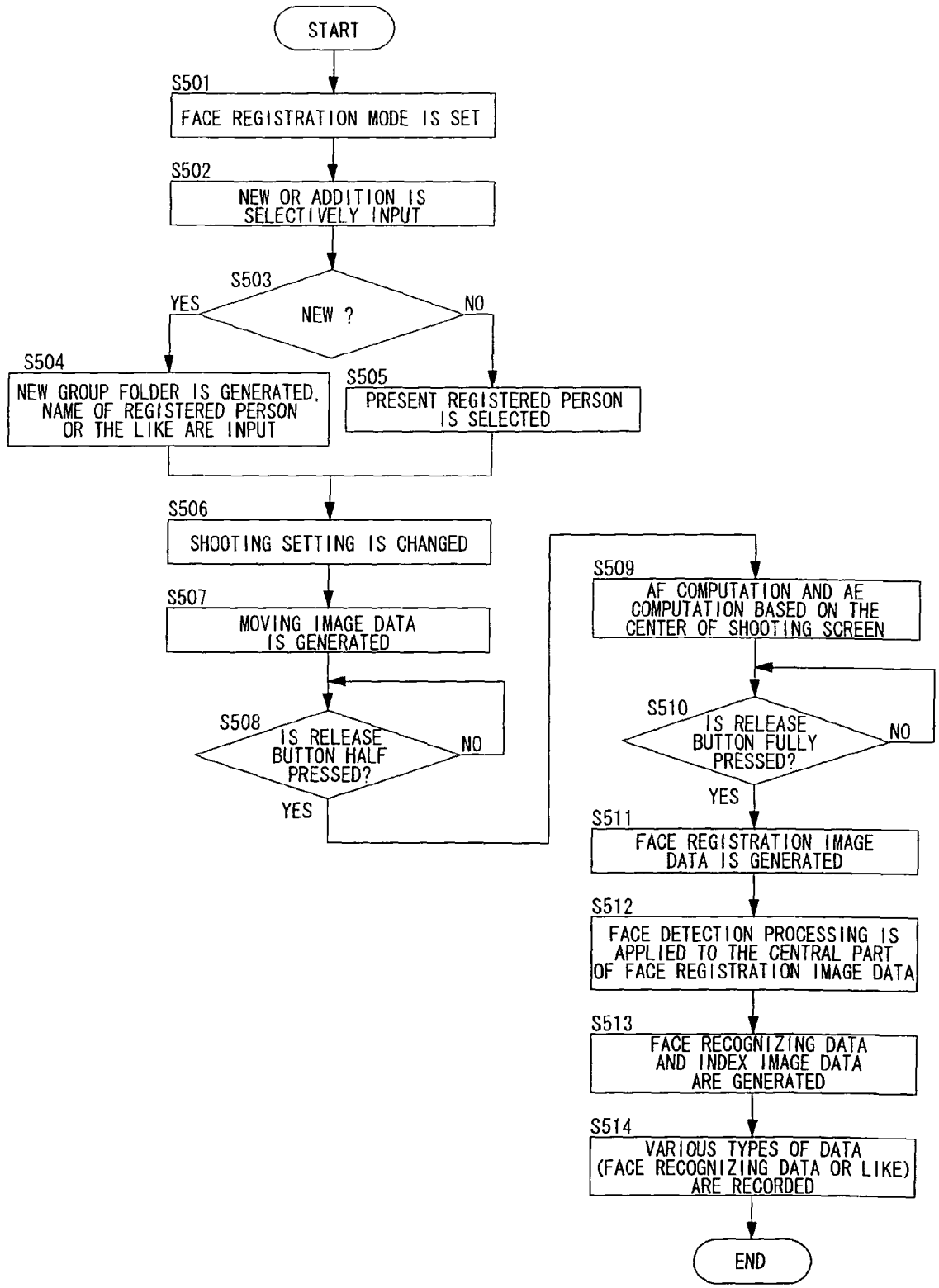
FIG. 10 is a flow chart showing the operations of Embodiment 4 in a "face registration mode".

FIG. 10 is a flow chart showing the operations of Embodiment 4 in the "face registration mode." In addition, since S501 to S505 in FIG. 10 respectively correspond to S101 to S105 in FIG. 2, and S513 and S514 in FIG. 10 respectively correspond to S115 to S116 in FIG. 2, the explanation of which will be omitted here for avoiding overlapping description.

Operation S506: The CPU 26 changes a setting on shooting by the electronic camera to a setting appropriate for face registration shooting. More specifically, the CPU 26 sets shooting similarly as given in (3) to (7) of S106 and additionally sets the following processing as given in (a) and (b).

(a) The CPU 26 selects an AF area at the center of a shooting screen in the "face registration mode" to carry out AF computation. In this case, the CPU 26 conducts focusing in a so-called center-emphasis AF according to an operation in which the release button is half-pressed, thereby controlling the focusing so as to lock AF when in focus. This is because a face registration image is acquired at the center of a shooting screen, thereby reducing influence resulting from aberration of a shooting optical system to generate face recognition data high in accuracy.

(b) The CPU 26 sets in the "face registration mode" an AE mode to a spot AE mode, which is based on the center of the shooting screen. Thereby, the face shot at the center of the shooting screen can be exposed optimally.

Operation S507: The CPU 26 drives the image sensor 16 to acquire a moving image signal. The image sensor 16 outputs the moving image signal at every predetermined time interval in an intermittent readout. The image processing section 20 generates moving image data based on the moving image signal. Then, a preview image is displayed by animation on the liquid crystal monitor 24 based on the moving image data.

Figure 11:
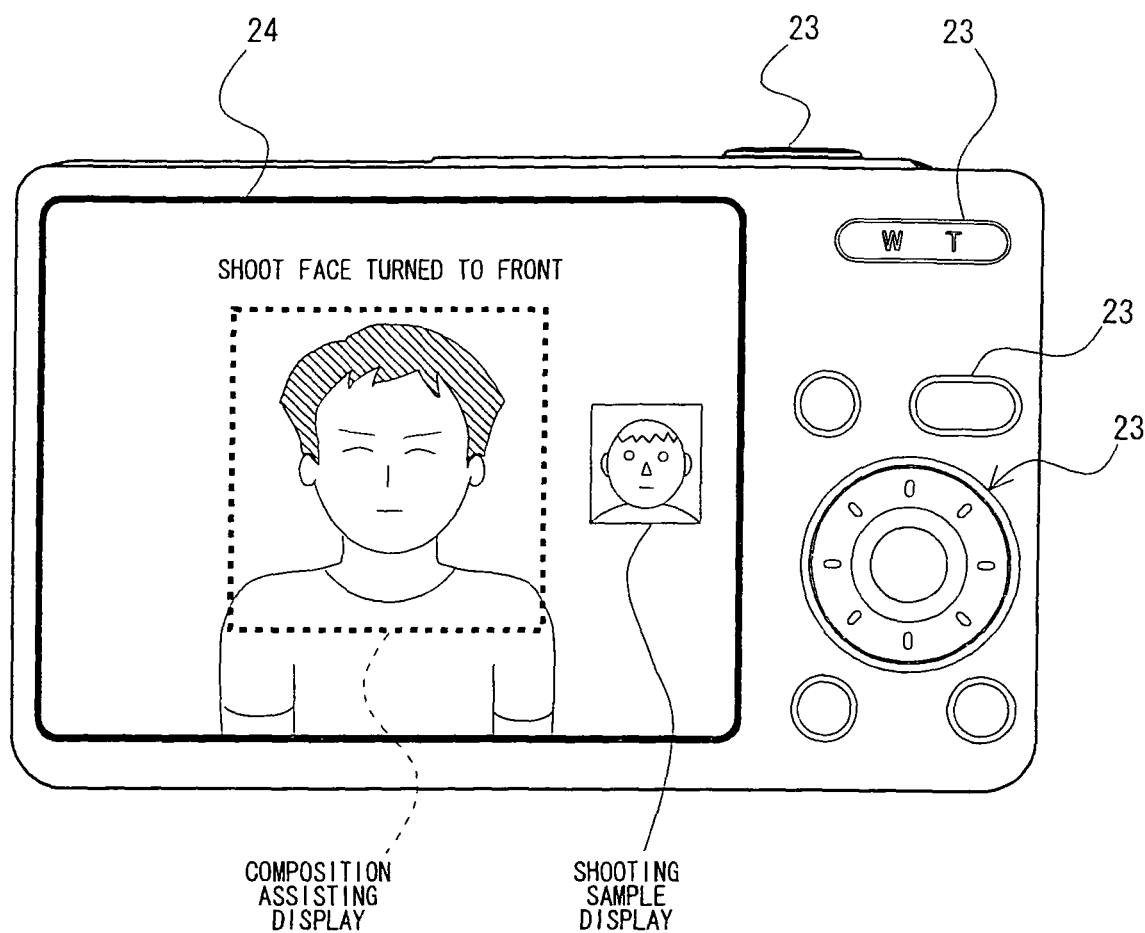
FIG. 11 is a drawing showing a display example of a preview image in Embodiment 4.

In this case, the image processing section 20 in S507 synthesizes a composition assisting display at the center of shooting screen of the preview image (refer to FIG. 11). The composition assisting display in FIG. 11 shows a position at which the face is accommodated inside the shooting screen in a rectangular frame. A user is able to easily set the position of the face on framing by using the composition assisting display. Thus, the user is able to easily shoot a face registration image under good conditions. In addition, as another example of the composition assisting display, only four corners on the rectangular frame may be synthesized into a preview image. Alternatively, as still another example of the composition assisting display, color for displaying an image may be changed in and out of a range at which the face is accommodated, for example, by displaying a range other than that at which the face is accommodated in black and white (neither of which is illustrated).

Further, the image processing section 20 in S507 synthesizes a shooting sample display at a peripheral range other than the center of a preview image (refer to FIG. 11). The shooting sample display in FIG. 11 displays the photo of the face and the illustration of a person who turns to a predetermined direction. For example, where a face registration image covering the front of the face is shot, an image of the face turned to the front is displayed on the shooting sample display. The shooting sample display is helpful to a user in understanding visually a state of the face appropriate for shooting this time (a direction in which the face turns or the like). Therefore, the user is able to easily shoot a face registration image under favorable conditions. Further, the image processing section 20 may synthesize a message display such as "shooting the front of the face" into a preview image.

Operation S508: the CPU 26 determines whether the release button is half-pressed. Where the release button is half-pressed (where YES), the CPU proceeds to S509. On the other hand, where no input is given to the release button (where NO), the CPU 26 returns to S507.

Operation S509: The CPU 26 executes AF computation and AE computation based on the center of a shooting screen according to an operation in which the release button is half-pressed by a user.

Operation S510: The CPU 26 determines whether the release button is fully pressed. Where the release button is fully pressed (where YES), the CPU 26 proceeds to S511. On the other hand, where no input is given to the release button (where NO), the CPU 26 stands ready for an operation in which the release button is fully pressed.

Operation S511: The CPU 26 acquires the shooting image data (face registration image data) according to an operation in which the release button is fully pressed by a user.

Operation S512: The face detecting section 31 of the CPU 26 applies known face detection processing to a central part of a shooting screen of the face registration image data (S511) to detect a face area inside the shooting screen.

Hereinafter, an explanation will be made for the effects of Embodiment 4 in the "face registration mode." In Embodiment 4, face recognizing data is generated based on face registration image data shot manually by a user. Therefore, it is possible to generate the face recognizing data according to the intention of the user. Further, since a face registration image is acquired at the center of the shooting screen lower in influence resulting from aberration of a shooting optical system, it is possible to generate the face recognizing data higher in accuracy.

(Exemplified Variations of Face Registration Modes from Embodiment 1 to Embodiment 4)

In the above embodiment, an explanation was made for a case where the face recognizing data was generated from the face registration image on shooting. However, in place of generating the face recognizing data from the face registration image, the CPU may cut out a part of the face area from the face registration image to generate face image data, thereby recording the face image data in a memory or on a recording medium. Then, post-processing may be given by using a computer to generate the face recognizing data from the face image data.

In this case, the face image data is generated by cutting out a face area of the face registration image, for example, in a size of about 80×80 pixels. It is preferable that no variable processing by resolution conversion is applied to an image of the face image data. Further, as with the face registration image data, it is preferable that the CPU records the face image data by allowing the data to correspond to the index image data and to the shooting conditions and the shooting date and hour of the face registration image data. Still further, it is preferable that with regard to the above face image data the CPU groups a plurality of face image data generated from the same captured person into the same folder or the like and records them.

Explanation of Embodiment 5

Embodiment 5 is an exemplified variation of Embodiment 1 in which an electronic camera, which is one example of the image processing device of the present invention, is used to generate face recognizing data from a shooting image. In this case, since the electronic camera of Embodiment 5 is made up common to Embodiment 1, the explanation of which will be omitted for avoiding overlapping description.

(Operations in Face Registration Mode)

Figure 12:
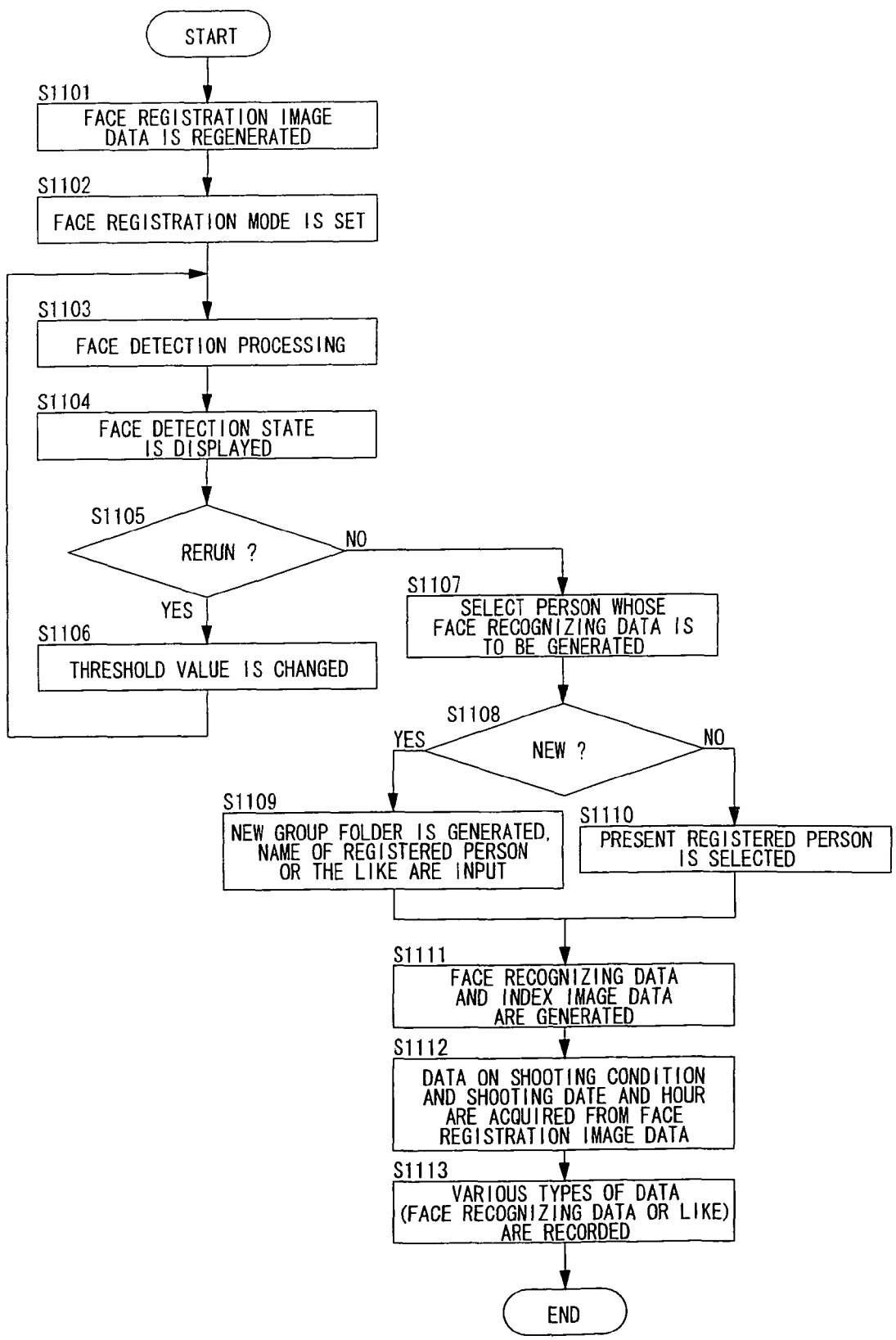
FIG. 12 is a flow chart showing the operations of Embodiment 5 in a "face registration mode".

FIG. 12 is a flow chart showing the operations of Embodiment 5 in a "face registration mode." The "face registration mode" is a type of regeneration mode and a mode for generating face recognizing data on reproduction of the shooting image data.

Operation S1101: First, a user sets the electronic camera to a "regeneration mode" by using the operating member 23. The CPU 26 reads out face registration image data (shooting image data used in generating the face recognizing data) from the recording medium 29 or the built-in memory 19 and reproduces and displays a reproduced image of the face registration image data on the liquid crystal monitor 24. In addition, the CPU 26 is able to read out face registration image data from a computer (not illustrated) coupled via an external connecting terminal of the input output I/F 22 or the communication unit 30.

Operation S1102: A user sets a mode of the electronic camera to a "face registration mode" by using the operating member 23.

Figure 13:
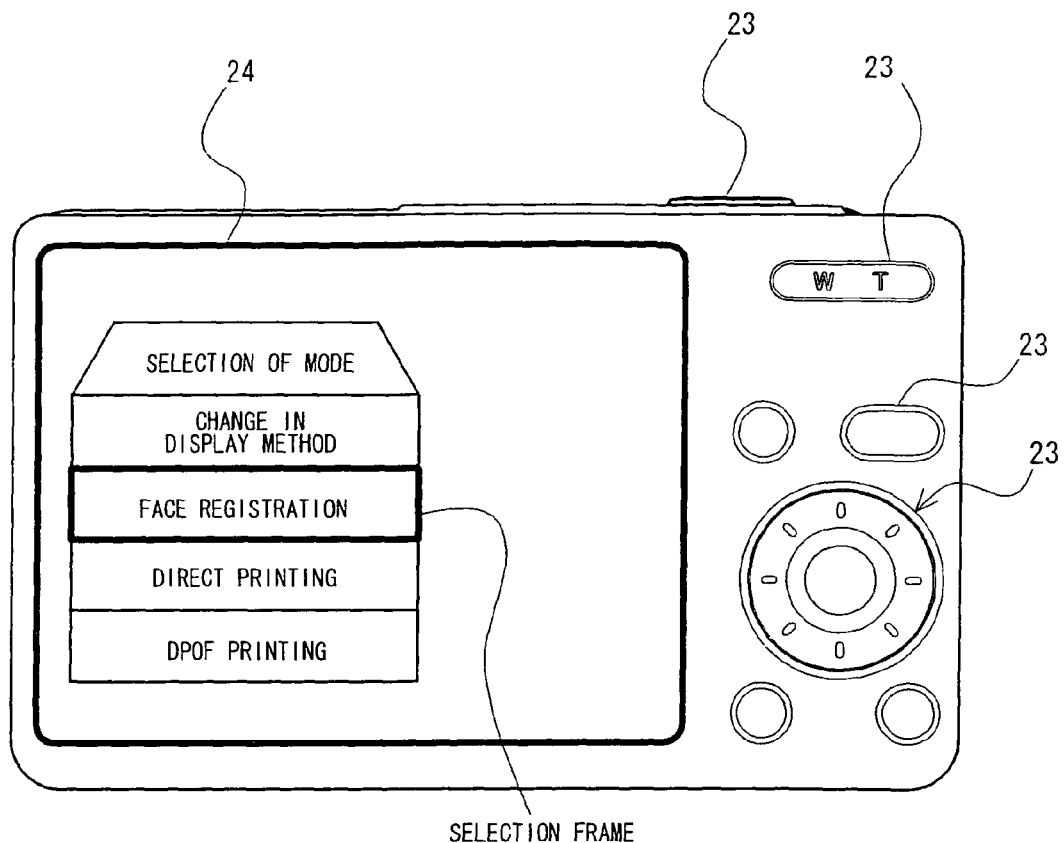
FIG. 13 is a drawing showing one example of a mode selection screen capable of specifying the face registration mode.

For example, in a state where the electronic camera is set to a "regeneration mode," the user operates to bring up a mode selection screen. Thereby, the CPU 26 displays the mode selection screen (refer to FIG. 13) on the liquid crystal monitor 24. The user operates a selection frame on the mode selection screen by using the operating member 23, designating the CPU 26 to actuate the "face registration mode." Thereby, the CPU 26 starts a series of operations in the "face registration mode."

Operation S1103: The face detecting section 31 of the CPU 26 applies known face detection processing to face registration image data (S1101) to detect a face area inside a shooting screen.

Figure 14:
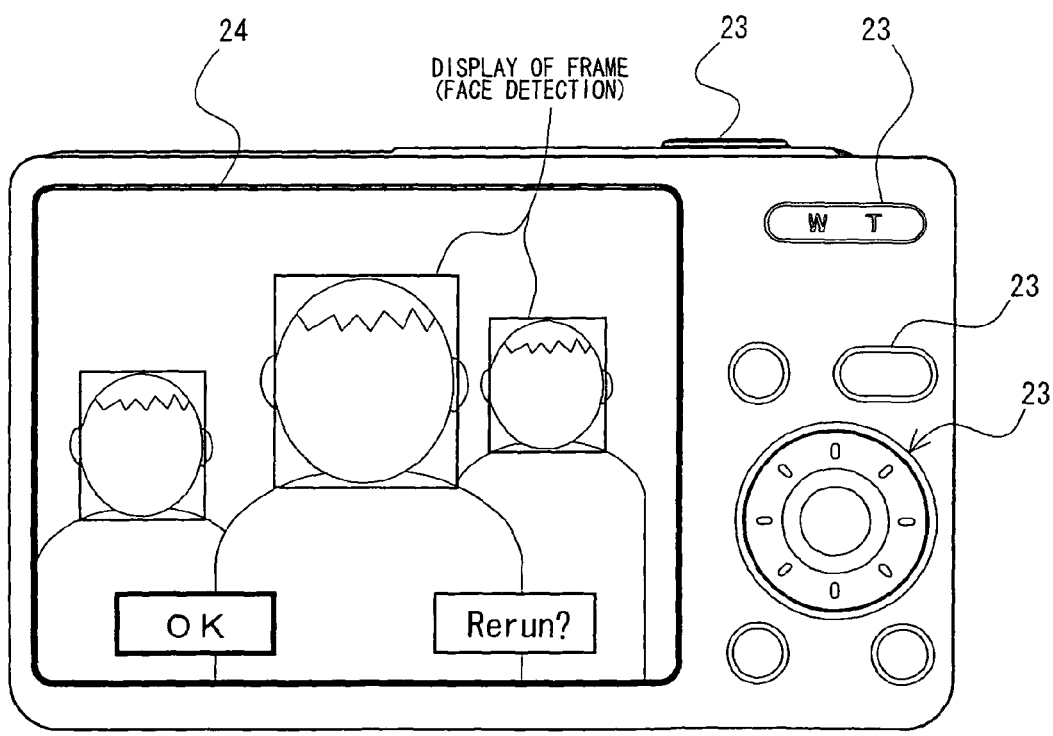
FIG. 14 is a drawing showing one example which confirms the retrial of face detection processing.
Figure 15:
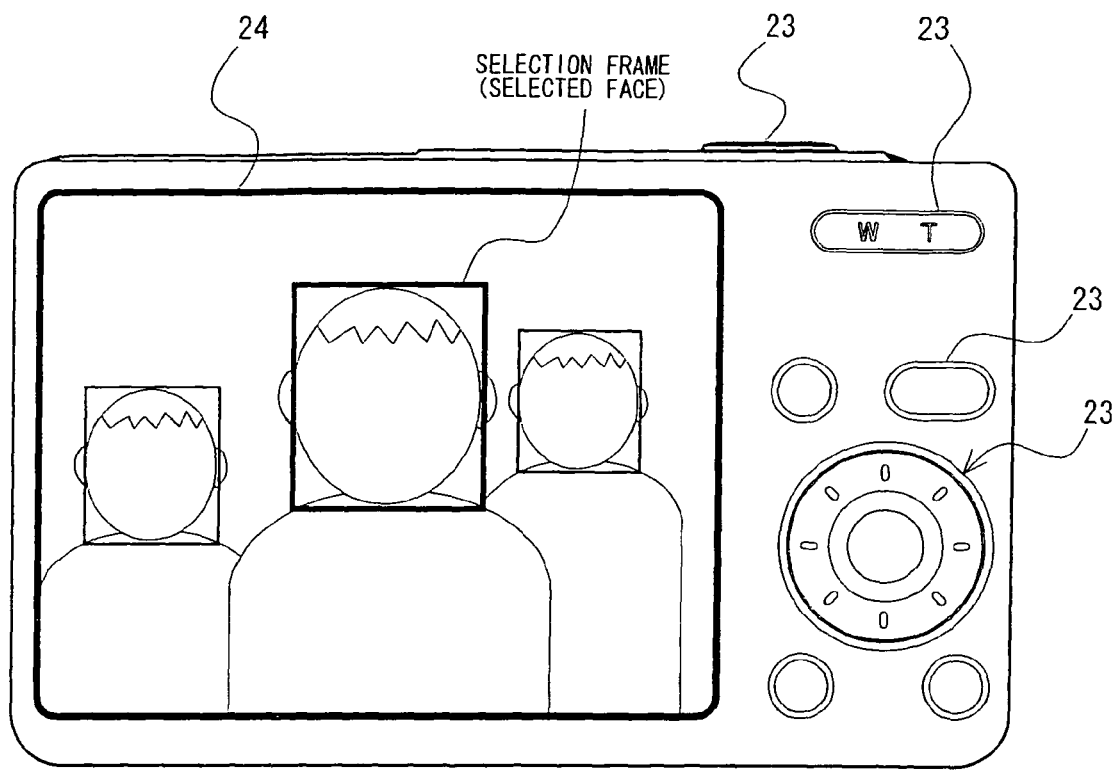
FIG. 15 is a drawing showing a state of selecting a face area by a selection frame.
Figure 16:
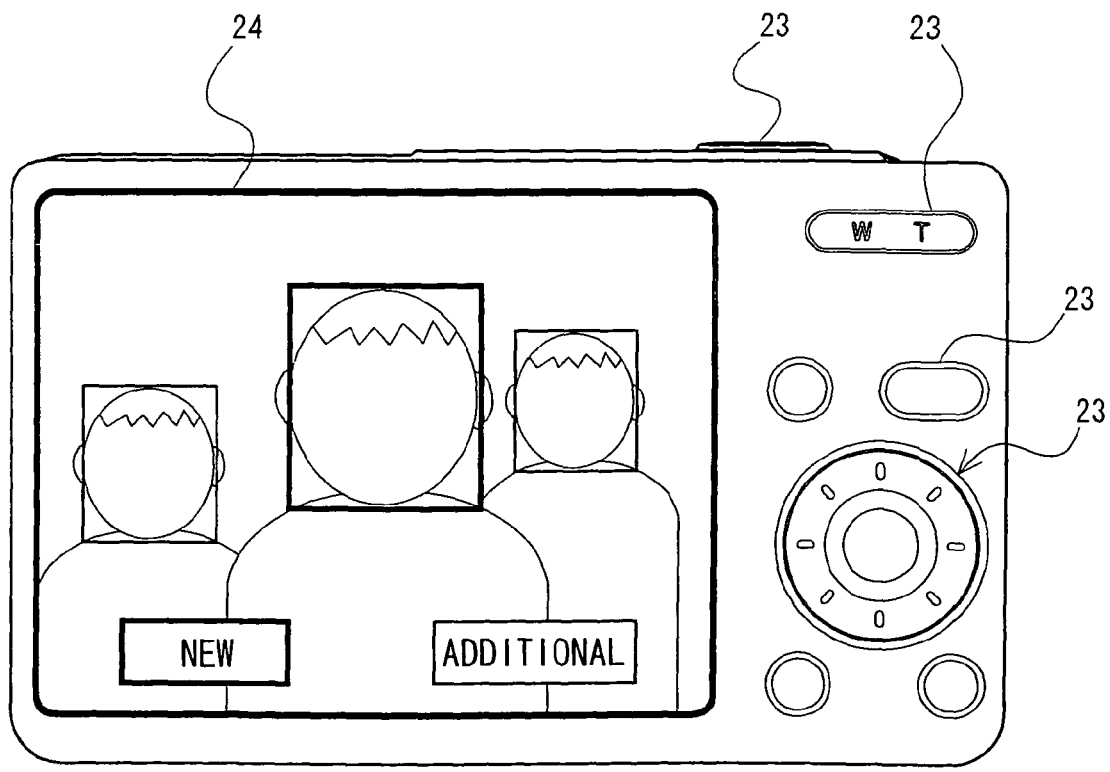
FIG. 16 is a drawing showing one example which displays selectively "new" or "addition".

Operation S1104: The CPU 26 outputs a position of the face area on the shooting screen to an image processing section 20. Then, the image processing section 20 synthesizes and displays a rectangular frame at a position of a face area of a reproduced image (refer to FIG. 14 to FIG. 16). Thereby, a user is able to confirm a state of face detection by referring to the liquid crystal monitor 24.

Operation S1105: The CPU 26 displays on the liquid crystal monitor 24 an indication prompting a user to confirm the retrial of face detection processing (selective display of "OK" or "rerun") (refer to FIG. 14). Where no frame is given to the face of a person to be registered, the user selectively inputs "rerun" by using the operating member 23. On the other hand, where the frame is given to the face of a person to be registered, the user selectively inputs "OK" by using the operating member 23.

Then, the CPU 26 determines by referring to the above confirmation indication whether "rerun" (retrial of the face detection processing) is selected. Where "rerun" is selected (where YES), the CPU 26 proceeds to S106. On the other hand, where "OK" is selected (where NO), the CPU 26 proceeds to S1107.

Operation S1106: The face detecting section 31 of the CPU 26 changes a threshold value for specifying the detection accuracy of a face area based on the input from a user by using the operating member 23.

For example, where no frame is given to the face of a person to be selected, a user changes the above threshold value to a value lower than a previous value. Thereafter, the CPU 26 returns to S1103, and the face detecting section 31 applies face detection processing to the face registration image data, thereby detecting again a face area inside a shooting screen. In this case, the accuracy rate of correctly detecting the face area is decreased, while the number of face candidates (face areas to which a frame is given) is increased as compared with a previous case. Therefore, it is more likely to detect a face area in a state where detecting the face may be difficult (for example, the face turned to the side).

Further, where many persons are included in the face registration image and face candidates are detected more than necessary, a user changes the above threshold value to a value higher than the previous value. Thereafter, the CPU 26 returns to S1103, and the face detecting section 31 applies face detection processing to the face registration image data, thereby detecting again a face area inside a shooting screen. In this case, since there is an increase in the accuracy rate of correctly detecting the face area, the number of face candidates is narrowed down to easily perform a selection work to be described later (S1107).

Operation S1107: The CPU 26 synthesizes and displays a selection frame on any of the face areas in the face registration image (S1103) (refer to FIG. 15). A user operates the selection frame by using the operating member 23 to select a person for whom the face recognizing data is generated. At the same time, the CPU 26 accepts the selective input by the user. In addition, the user is able to select a plurality of face areas from one reproduced image in S1107.

Operation S1108: The CPU 26 displays on the liquid crystal monitor 24 an indication prompting a user to confirm whether the thus selected person is a newly registered person (selective display of "new" or "addition") (refer to FIG. 16). On this screen, the user operates a selection frame by the input button to selectively input "new" or "addition" into the CPU 26. Where the face of a new person is registered, the user selectively inputs "new." On the other hand, where the face of the already registered person is additionally shot, the user selectively inputs "addition."

Then, the CPU 26 determines by referring to the above indication for confirmation whether "new" is selected. Where "new" is selected (where YES), the CPU 26 proceeds to S1109. On the other hand, where "addition" is selected (where NO), the CPU 26 proceeds to S1110.

Operation S1109: Where "new" is selected in S1108, the CPU 26 generates a group folder of the newly registered person in the face registration memory 27. Then, the CPU 26 displays "detailed information screen of registered person" on the liquid crystal monitor 24 (refer to FIG. 5), prompting a user to input information on the "name of registered person" and "processing setting on face recognition." The information input on the "detailed information screen of registered person" in FIG. 5 is recorded in the face registration memory 27 in a state where it is allowed to correspond to a group folder. Thereafter, the CPU 26 proceeds to S1111.

In addition, a user is able to omit the input of the "name of registered person" and "processing setting on face recognition" but input the information in the face registration memory 27 after starting up again "detailed information screen of registered person" in FIG. 5.

Operation S1110: On the other hand, where "addition" is selected in S1108, the CPU 26 displays on the liquid crystal monitor 24 a selecting screen of the registered person who has already been registered (refer to FIG. 4), prompting the user to selectively input the registered person to whom the face recognizing data is added.

Operation S1111: The face recognizing section 32 of the CPU 26 generates the face recognizing data of the registered person from a face area selected among face registration image data (S1107). Further, the image processing section 20 trims the face area of the face registration image data and resizes it into a predetermined size by resolution conversion to generate index image data.

Operation S1112: The CPU 26 acquires data on the shooting conditions and the shooting date and hour recorded at an attachment data area of face registration image data.

For example, where the face registration image data is an image file based on the standards of Exif (Exchangeable image file format for digital still cameras), the CPU 26 reads out the data on the shooting conditions and the shooting date and hour recorded at the image file in a tag format and acquires it. In addition, where a data format of the face registration image data does not include the above attachment data area, this operation is omitted.

Operation S113: The CPU 26 records in the face registration memory 27 the shooting conditions and the shooting date and hour of the face recognizing data, index image data and face registration image data. Each of these data is recorded in a group folder of the registered person specified in S1109 or S1110 in a state where these data are allowed to respectively correspond thereto. Of the above data, the index image data corresponds to "face registration image." Further, the shooting date and hour corresponds to "registration time of face recognizing data," while the shooting conditions correspond to "shooting conditions on acquisition of face recognizing data."

As described so far, a series of operations in the "face registration mode" are completed. In addition, where a plurality of face areas are specified in S1107, the CPU 26 repeats the processing from S1108 to S1113, depending on the number of face areas.

Hereinafter, an explanation will be made for the effects of Embodiment 5 in a "face registration mode." In the face registration mode, face recognition data is generated from shooting image data read from a recording medium 29 or the like on regeneration (S1101, S1111). In other words, since the face recognizing data can be generated from the shooting image data obtained in the past and the shooting image data obtained by using other electronic cameras, a user benefits greatly in terms of convenience.

Further, in the above-described face registration mode, the face recognizing data is generated based on a face area automatically detected by the face detection processing (S1103, S1111). In this case, a user only specifies a target for which the face recognizing data is generated from face areas detected, thus making it possible to easily generate the face recognizing data.

(Exemplified Variation of Operations of Face Registration Mode)

In Embodiment 5, an explanation was made for a case where the face recognizing data was generated from face registration images on shooting. However, in place of generating the face recognizing data from face registration images, the CPU may cut out a part of the face area from face registration images to generate face image data and record the face image data in a memory or on a recording medium. Then, post-processing may be given by using a computer to generate the face recognizing data from the face image data.

In this case, the face image data is generated by cutting out a face area of the face registration image, for example, in a size of about 80×80 pixels. It is preferable that no variable processing by resolution conversion is given to an image of the face image data.

Further, as with the face registration image data, it is preferable that the CPU records the face image data by allowing the data to correspond to the index image data and to the shooting conditions and the shooting date and hour of the face registration image data. Still further, it is preferable that the CPU groups a plurality of face image data generated from the same captured person into the same folder or the like and record them.

Explanation of Embodiment 6

Embodiment 6 is an exemplified variation of Embodiment 1 and related to the operation and display of an edit screen for various types of data in the face registration memory 27 as well as operations of the face recognizing shooting mode. In this case, since the electronic camera of Embodiment 6 is made up common to Embodiment 1, the explanation of which will be omitted for avoiding overlapping description.

(Explanation of Start-Up Operation of Edit Screen)

An explanation will be made for an edit screen of the electronic camera in Embodiment 6. Where various types of data in the face registration memory 27 are edited or confirmed, a user (operator) starts up the edit screen by using the operating member 23.

In this case, the information on a person registered in the face registration memory 27 is privacy information for an owner of the electronic camera. Therefore, the CPU 26 of the electronic camera can be set in such a manner that a user (operator) is subjected to personal authentification and an edit screen is displayed only where the user is previously permitted by an owner. In this case, the personal authentification includes, for example, authentification by inputting a password and face authentication. Further, known authentification devices based on biometrics such as fingerprint authentification and iris authentification may be loaded in an electronic camera. The face authentication is in particular preferable in that the constitution of the face recognition processing of the electronic camera can be used as it is and in that a user attempting an improper access is psychologically suppressed due to the fact that his or her face is shot.

Figure 17:
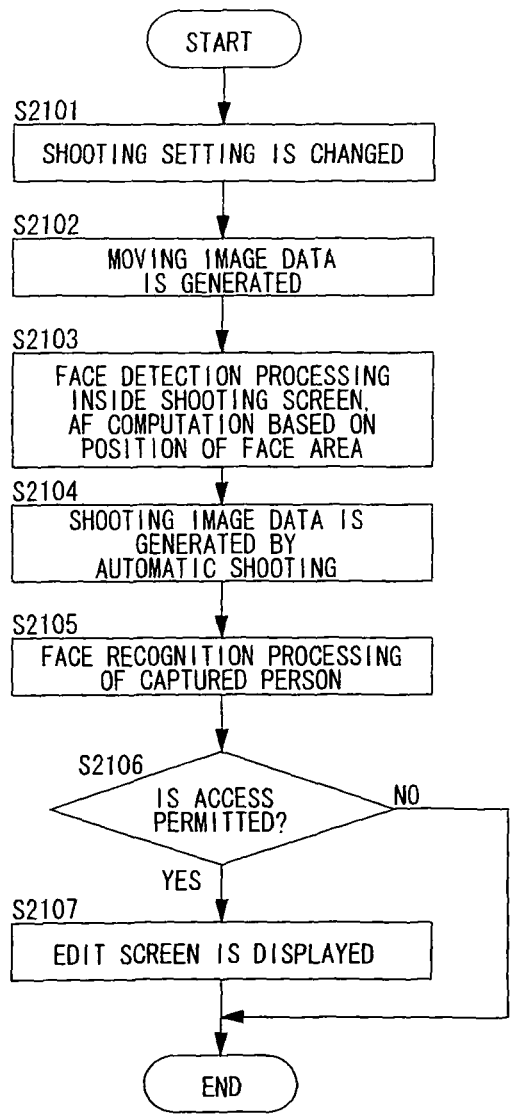
FIG. 17 is a flow chart showing a case where face authentication is made by starting up an edit screen in Embodiment 6.

FIG. 17 is a flow chart showing the face authentication when an edit screen is started up. In addition, the face recognizing data on a user whose access to the edit screen is permitted is to be recorded in advance in the face registration memory 27.

Operation S2101: First, the user operates to start up the edit screen by the operating member 23. Thereby, the CPU 26 displays on the liquid crystal monitor 24 a message which prompts to shoot the face, such as "shooting the face." Further, the CPU 26 changes various types of settings for the electronic camera to a setting appropriate in shooting for face authentication. More specifically, the CPU 26 provides the following settings.

First, the CPU 26 sets an AF mode to a face detection mode. In this case, the CPU 26 automatically repeats focusing on a detected face area by referring to the moving image data, irrespective of the operation of the release button. Further, the CPU 26 sets the AE mode to a spot AE mode based on the face detecting area. In this case, the CPU 26 executes AE computation, focusing on a detected face area by the moving image data. In this case, focusing and release are automatically conducted, thus making it possible to shoot by an operator alone by pointing a shooting optical system at himself or herself.

In addition, in S2101, the CPU 26 provides the following settings of (1) to (5), whenever necessary.

(1) The CPU 26 disables the digital zoom processing by the image processing section 20. This is because when digital zoom is conducted, information obtained on shooting images is decreased to result in a lower accuracy of extracting feature points of the face.

(2) The CPU 26 fixes a position of a zoom lens 11 a to the wide-angle end. This is because on detection of the face, there is an increase in possibility of detecting the face, when the zoom lens is fixed to the wide angle side to make a field depth greater. Further, when the zoom lens is set to the wide angle side, it is less likely that a shooting image is blurred by camera shake.

(3) The CPU 26 allows an image blurring correcting lens 14 to move according to the output of a sway sensor section 13, thereby correcting an optically blurred image. This is because of the avoidance of shooting failure caused by camera shake.

(4) The CPU 26 performs a higher gain setting of image signals (setting of image sensitivity) to the analog signal processing section 17 than on normal shooting.

This is because when the image sensitivity is made higher, shooting time corresponding to shutter second is made shorter to decrease the possibility of blurring a shooting image by camera shake.

(5) The CPU 26 disables the flash emission by the flash emitting section 25. This is because when the flash emission is emitted on shooting, there is developed a shadow on the face of a captured person to result in a decreased accuracy of detecting the face. In addition, where the shooting is performed forcibly in a state where a field is dark to result in a failure in securing a sufficient exposure, the CPU 26 may allow the flash emitting section 25 to emit flash exceptionally.

Operation S2102: The CPU 26 drives the image sensor 16 to acquire a moving image signal. The image sensor 16 outputs the moving image signal at every predetermined time interval in an intermittent readout. The image processing section 20 generates moving image data based on the moving image signal.

Operation S2103: On the other hand, the face detecting section 31 of the CPU 26 applies known face detection processing to moving image data to detect a face area inside a shooting screen. Then, the CPU 26 executes AF computation and AE computation based on a position of the thus detected face area.

Operation S2104: The CPU 26 conducts an automatic release after completion of AF and drives the image sensor 16, thereby shooting a subject image. Thereafter, the image processing section 20 generates shooting image data based on an image signal at release.

Operation S2105: The face recognizing section 32 of the CPU 26 extracts feature points of the face from a face area of the shooting image data (S2104) based on the results of face detection in S2103. Then, the face recognizing section 32 executes the face recognition processing of a captured person.

Operation S2106: The face recognizing section 32 determines whether the detected fact is the face of a "user whose access to the edit screen is permitted." Where the face is that of the "user whose access to the edit screen is permitted" (where YES), the CPU 26 proceeds to S2107. On the other hand, where the face is not that of the "user whose access to the edit screen is permitted" (where NO), the CPU 26 completes the processing without displaying the edit screen on the liquid crystal monitor 24.

On determination in S2106, it is preferable that the face recognizing section 32 sets a threshold value for determining the degree of resemblance by the face recognition processing to be higher than on normal shooting. This is because in this case, it is desired to recognize a "user whose access to the edit screen is permitted" more securely.

Operation S2107: The CPU 26 allows the liquid crystal monitor 24 to display the edit screen. Thereby, the user whose access to the edit screen is permitted is able to manage and edit the face recognizing data by referring to the edit screen.

(Explanation of Display and Operation of Edit Screen)

Figure 4:
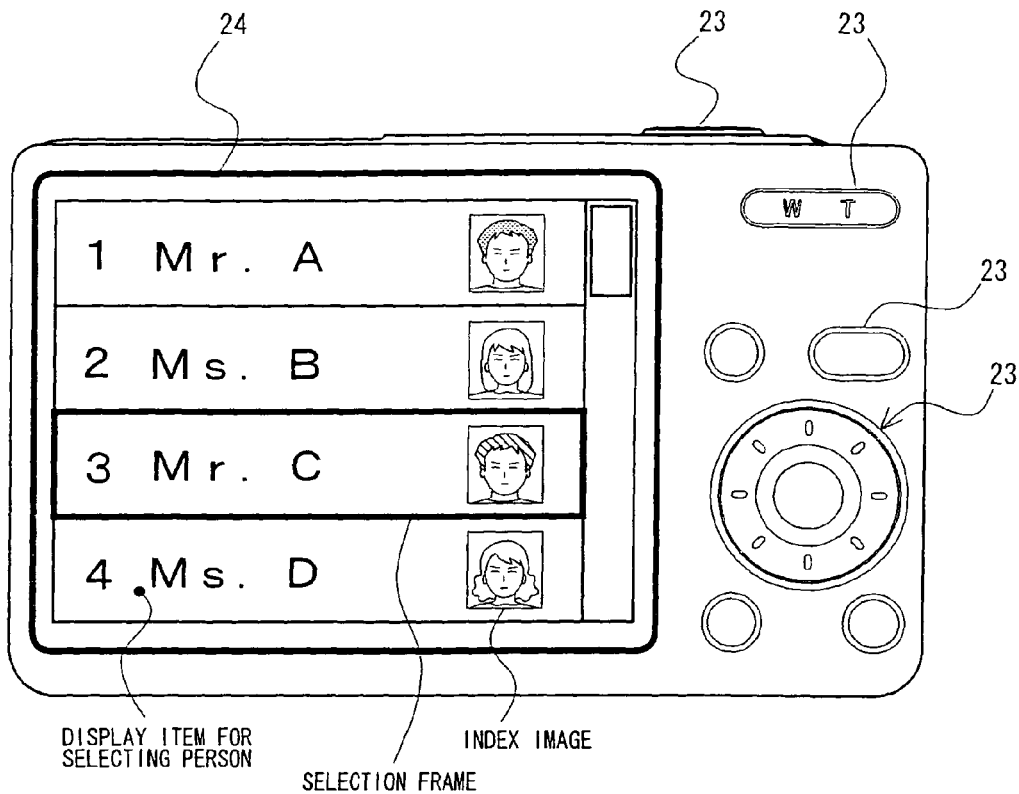
FIG. 4 is a drawing showing one example of a selection screen of a registered person.

FIG. 4 and FIG. 5 are drawings showing one example of displaying an edit screen. The edit screen is made up of a "selecting screen of registered person (refer to FIG. 4)" and a "detailed information screen of registered person (refer to FIG. 5)" in a format of GUI (Graphical User Interface). In addition, the display processing and operations on the edit screen shown below are all executed by the CPU 26 according to predetermined sequence programs.

"Selecting screen of registered person" in FIG. 4 is an initial display screen of the edit screen. Person-selecting display items corresponding to a registered person of the face registration memory 27 are displayed on the "selecting screen of registered person." The number of the person-selecting display items is in agreement with the number (the number of group folders) of registered persons of the face registration memory 27. Then, the person-selecting display items are displayed on the "selecting screen of registered person" so as to be given in an enlisted manner. In addition, the person-selecting display items may be only partially displayed on the "selecting screen of registered person" and given in an enlisted manner by switching to a scroll format or a page-based format.

A "name of registered person" is given to each of the above person-selecting display items. Data on the "name of registered person," which is allowed to correspond to a group folder of a registered person in the face registration memory 27, is used for the "name of registered person." Further, in order to increase the discrimination and retrieval properties in the person-selecting display items, an index image indicating a corresponding registered person is displayed in the person-selecting display items. For example, the CPU 26 sets the index image of the person-selecting display items by the following procedures.

First, the CPU 26 sets an illustration image selected by a user from a predetermined group of illustration images to the index image. The illustration image may be effectively used in specifying or classifying a registered person according to the intention of the user. The above illustration image is previously recorded in a ROM (not illustrated) or the like and made up of data formats such as GIF format and BMP format. In addition, the above illustration image includes graphic symbols such as a heart mark and a star as well as characters such as "family" and "friend."

Second, the CPU 26 sets a "face registration image" of registered persons recorded at each of the group folders in the face registration memory 27 to the index image. In this case, the face registration image is helpful in visually clarifying a relationship between the person-selecting display items and registered persons, which is in particular preferable.

Further, where a plurality of "face registration images" are recorded in the group folder, the CPU 26 selects the index image by any one of the following procedures (1) to (4).

(1) The CPU 26 sets a face registration image selected by a user from a plurality of face registration images to the index image. In this case, since a face registration image determined to be optimal by the user is used as the index image, it is possible to reflect the intention of the user and display it on the screen.

(2) The CPU 26 sets to the index image an image, which is the newest in shooting date and hour among a plurality of face registration images by referring to "registration time of face recognizing data" in the face registration memory 27. In this case, since a face registration image, which is the newest in a registered person, is automatically given as the index image, it is possible to display the face, which is considered to be a state closest to the present registered person.

(3) The CPU 26 selects a face registration image taken for the front of the face among a plurality of face registration images and sets it to the index image. In this case, since a face image having the face turned to the front is automatically given as the index image, it is possible to improve further the discrimination and retrieval properties of the person-selecting display items. In addition, where a plurality of face registration images taken for the front of the face are available, the CPU 26 sets an image newer in shooting date and hour to the index image as shown in the above (2).

In this case, the direction of the face in the face registration image is detected as follows. For example, recognition information on the direction of the face is recorded in advance in the face recognizing data, and the CPU 26 may determine the direction of the face in the face registration image by referring to the recognition information. Further, with attention given to the face recognizing data corresponding to the face registration image, the CPU 26 may estimate the direction of the face by referring to an extracted state of feature points such as the eyes, nose, and mouth in the face recognizing data.

(4) The CPU 26 displays and sets the index image in a slideshow format by sequentially switching a plurality of face registration images at predetermined time intervals. In this case, a user is able to understand the registration number of face registration images of a registered person on the "selecting screen of registered person" (that is, the registration number of face recognizing data). Further, it is possible to display the "selecting screen of registered person," which is frequent in visual change and highly entertaining, by switching the index images.

Next, an explanation will be made for an operation on the "selecting screen of registered person." In the "selecting screen of registered person," a user is able to operate a selection frame (cursor or the like) given in bold lines in FIG. 4 by using the operating member 23, thereby designating the CPU 26 to specify and input a person-selecting display item. In addition, when the user specifies the display item and further inputs the decision, the screen is to be switched to a "detailed information screen of registered person" corresponding to a registered person specified by the display screen of the liquid crystal monitor 24. Further, data of the registered person corresponding to the display item can be deleted all at once on the "selecting screen of registered person."

Further, on the "selecting screen of registered person," a user is able to operate to specify the above display item, thereby designating the CPU 26 to specify and input a registered person to be recognized for the face (registered person whose face is recognized on shooting). In this case, the CPU 26 is able to accept one or two or more of registered persons. For example, the CPU 26 is able to accept the specification of all registered persons of the face registration memory 27. Still further, a group folder is previously linked to predetermined categories (such as family and group activities), and the user specifies and inputs a category on the selecting screen, thus making it possible to input all at once the specification of registered persons linked to the CPU 26.

In addition, on the "selecting screen of registered person," a user is able to set the CPU 26 so as to input a priority level of registered persons (a priority level where the "processing setting on face recognition" is competitive). The priority level can be exchanged individually by operating the specification of display items. Further, the CPU 26 is able to change a priority level of the registered person under predetermined conditions. For example, the CPU 26 is able to automatically set a priority level by sorting registered persons in an ascending order or a descending order based on (1) registration order of registered persons, (2) character string of name of registered person, (3) the number of face recognizing data in group folder, (4) the number of times for specifying face recognition or the like and following the order after sorted. Further, the CPU 26 is able to set higher the priority level of a registered person greater in the number of shootings based on the data on the number of shootings. In addition, on the "selecting screen of registered person," a position and an order of displaying person-selecting display items correspond to the priority level, and the person-selecting display items are to be displayed in a descending order of the priority level.

On the other hand, the "detailed information screen of registered person" in FIG. 5 is a screen divided into two parts, that is, an upper part and a lower part. Data on the "name of registered person" and that on "processing setting on face recognition" of a specified registered person are read out from the face registration memory 27 and respectively displayed at the upper part of the "detailed information screen of registered person." Then, on the "detailed information screen of registered person," any given items of the "name of registered person" and "processing setting on face recognition" are specified and the above data are set so as to be changed in content. In addition, the change in content on the "detailed information screen of registered person" is to be overwritten and reflected respectively at the "name of registered person" and "processing setting on face recognition" of the face registration memory 27.

Further, display items for face recognizing data corresponding to the face recognizing data are displayed at the lower part of the "detailed information screen of registered person." A total number of the display items for face recognizing data is in agreement with the number of the face recognizing data in a group holder of registered persons. Then, the display items for face recognizing data are displayed at the lower part of the "detailed information screen of registered person" so as to be given in an enlisted manner.

In addition, the display items for face recognizing data may be only partially displayed at the lower part of the "detailed information screen of registered person" and given in an enlisted manner by switching to a scroll format or a page-based format.

In this case, data allowed to correspond to individual face recognizing data is displayed in the display items for face recognizing data. Specifically, "face registration image" as an index image, "registration time of face recognizing data" and "shooting conditions on acquisition of face recognizing data" are respectively displayed in the display items for face recognizing data. A user is able to understand the details of each of the face recognizing data by referring to the above information and select easily the face recognizing data. In addition, the "shooting conditions on acquisition of face recognizing data" may be displayed for the details separately on a pull-down menu or on a different screen in place of not directly displaying the data in the display items for face recognizing data.

Then, a user is able to operate a selection frame (a cursor or the like) indicated in bold lines in FIG. 5 by using the operating member 23 and specify a display item for face recognizing data on the "detailed information screen of registered person." Then, it is possible to exchange an order of displaying specified display items and delete the face recognizing data corresponding to the specified display item on the "detailed information screen of registered person."

As described so far, since an index image is displayed in person-selecting display items on the "selecting screen of registered person," a user is able to easily discriminate the display item of a predetermined registered person. Further, since a face registration image is displayed in display items for face recognizing data on the "detailed information screen of registered person," the user is able to visually understand an outline of the face recognizing data corresponding to the display item concerned.

(Operations in Face Recognizing Shooting Mode)

Figure 18:
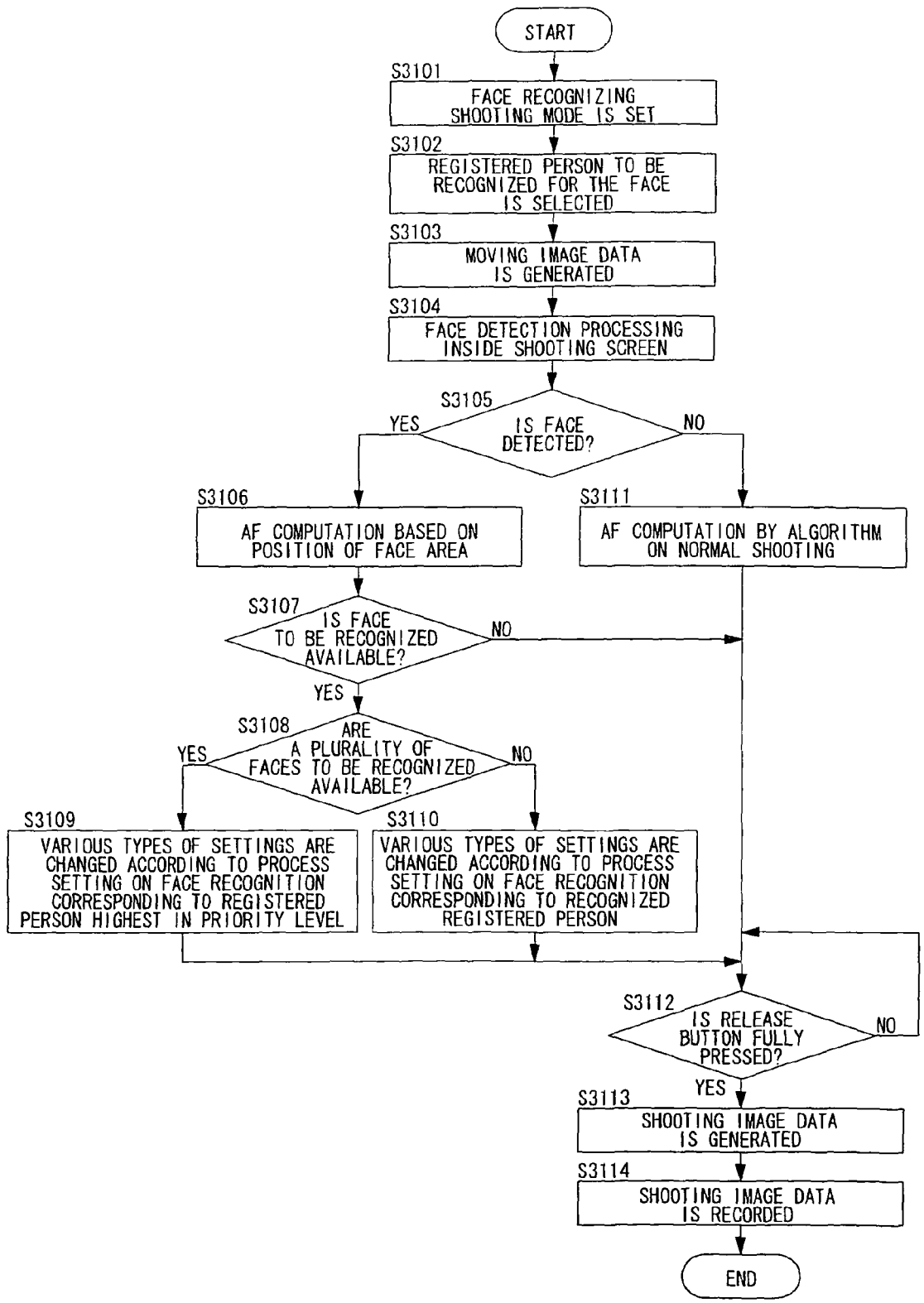
FIG. 18 is a flow chart showing the operations of Embodiment 6 in a "face recognizing shooting mode".

Hereinafter, an explanation will be made for operations of the electronic camera of Embodiment 6 in a "face recognizing shooting mode" by referring to FIG. 18. In addition, since S3101 in FIG. 18 corresponds to S201 in FIG. 7, the explanation of which will be omitted for avoiding overlapping description.

Operation S3102: The CPU 26 displays a selecting screen of registered persons (refer to FIG. 4) on the liquid crystal monitor 24. Then, the CPU 26 accepts to specify and input a registered person to be recognized for the face (a registered person whose face is recognized on shooting). In this case, a plurality of registered persons are to be specified by a user in S3102. In addition, the user can specify and input in advance the registered person to be recognized for the face into the CPU 26.

Operation S3103: The CPU 26 drives the image sensor 16 to acquire a moving image signal. The image sensor 16 outputs the moving image signal at every predetermined time interval in an intermittent readout. The image processing section 20 generates moving image data based on the moving image signal. Then, a preview image is displayed on the liquid crystal monitor 24 by animation based on the moving image data.

Operation S3104: On the other hand, the face detecting section 31 of the CPU 26 applies known face detection processing to the moving image data, thereby detecting a face area inside a shooting screen.

Operation S3105: The CPU 26 determines in S3104 by referring to a shooting screen whether the face is detected. Where the face is detected (where YES), the CPU 26 proceeds to S3106. On the other hand, where no face is detected (where NO), the CPU 26 proceeds to S3111.

Operation S3106: The CPU 26 executes AF computation based on a position detected at a face area. In addition, where a plurality of face areas are detected, the CPU 26 executes the AF computation, with priority given to a face area positioned at the center of the shooting screen or a face area positioned in the closest proximity.

Operation S3107: The face recognizing section 32 of the CPU 26 applies face recognition processing to the thus detected face area (S3104). Then, the face recognizing section 32 determines whether a face to be recognized (S3102) is included. Where the face to be recognized is included (where YES), the CPU 26 proceeds to S3108. On the other hand, where the face to be recognized is not included (where NO), the CPU 26 proceeds to S3111.

Operation S3108: The CPU 26 determines whether faces to be recognized are detected plurally. Where the faces to be recognized are detected plurally (where YES), the CPU 26 proceeds to S3109. On the other hand, where only one face to be recognized is available (where NO), the CPU 26 proceeds to S3110.

Operation S3109: The CPU 26 compares individually the priority levels of registered persons whose face is recognized by referring to the priority levels of registered persons set on an edit screen. Then, the CPU 26 changes a shooting setting condition for the electronic camera and a setting of image processing based on data on "processing setting on face recognition" corresponding to a registered person highest in the priority level. Thereafter, the CPU 26 proceeds to S3112. In addition, where a registered person is set for automatic shooting by the "processing setting on face recognition," the CPU 26 proceeds to S3113 and automatically shoots the registered person.

Operation S3110: The CPU 26 changes a shooting setting condition for the electronic camera and a setting of image processing based on the data on "processing setting on face recognition" corresponding to the thus detected registered person. Thereafter, the CPU 26 proceeds to S3112. In addition, where a registered person is set for automatic shooting by the "processing setting on face recognition," the CPU 26 proceeds to S3113 and automatically shoots the registered person.

Operation S3111: On the other hand, in this case, the CPU 26 selects an AF area by an algorithm on normal shooting in response to an operation in which the release button is half-pressed by a user, thereby executing AF computation.

Operation S3112: The CPU 26 determines whether the release button is fully pressed. Where the release button is fully pressed (where YES), the CPU 26 proceeds to S3113. On the other hand, where no input is given to the release button (where NO), the CPU 26 stands ready for an operation in which the release button is fully pressed.

Operation S3113: The CPU 26 drives the image sensor 16 to shoot a subject image. Thereafter, the image processing section 20 generates shooting image data based on an image signal at release.

In addition, where a face to be recognized is shot, the image processing section 20 applies image processing set in S3109 and S3110 to the shooting image data.

Operation S3114: The CPU 26 records the shooting image data on a recording medium 29. Further, where the face to be recognized is shot, the CPU 26 is able to classify and record the shooting image data in a predetermined record folder based on a directory path specified by the face registration memory 27.

Further, the CPU 26 increments the number of shootings of data on the number of shootings in the face registration memory 27 based on the result of face recognition in S3109 or S3110. In this case, the CPU 26 may increment the number of shootings of all the registered persons who have been recognized or may increment the number of shootings of only the registered persons who have been selected according to a priority level. As described so far, a series of operations in the "face recognizing shooting mode" are completed.

Hereinafter, an explanation will be made for the effects of Embodiment 6 in a "face recognizing shooting mode." In the face recognizing shooting mode, a captured person is recognized for the face based on the face recognizing data (S3107). Then, where a face to be recognized is detected, various types of processing on shooting are given in a setting corresponding to the registered person (S3109, S3110, S3113 and S3114). Therefore, it is possible to automatically conduct such a processing that reflects the intention of a user on shooting the registered person, greatly benefiting the user who uses an electronic camera.

Further, in the above face recognizing shooting mode, where a plurality of targets to be recognized are shot at once, applicable is a setting of a registered person highest in priority level set by a user (S3109). Therefore, it is possible to reflect appropriately the user's intention on a shooting image even in shooting a group photo. In particular, the priority level can be freely changed by the user on an edit screen, thus making it possible to give elaborate control easily, depending on shooting scenes or the like.

Explanation of Embodiment 7

Figure 19:
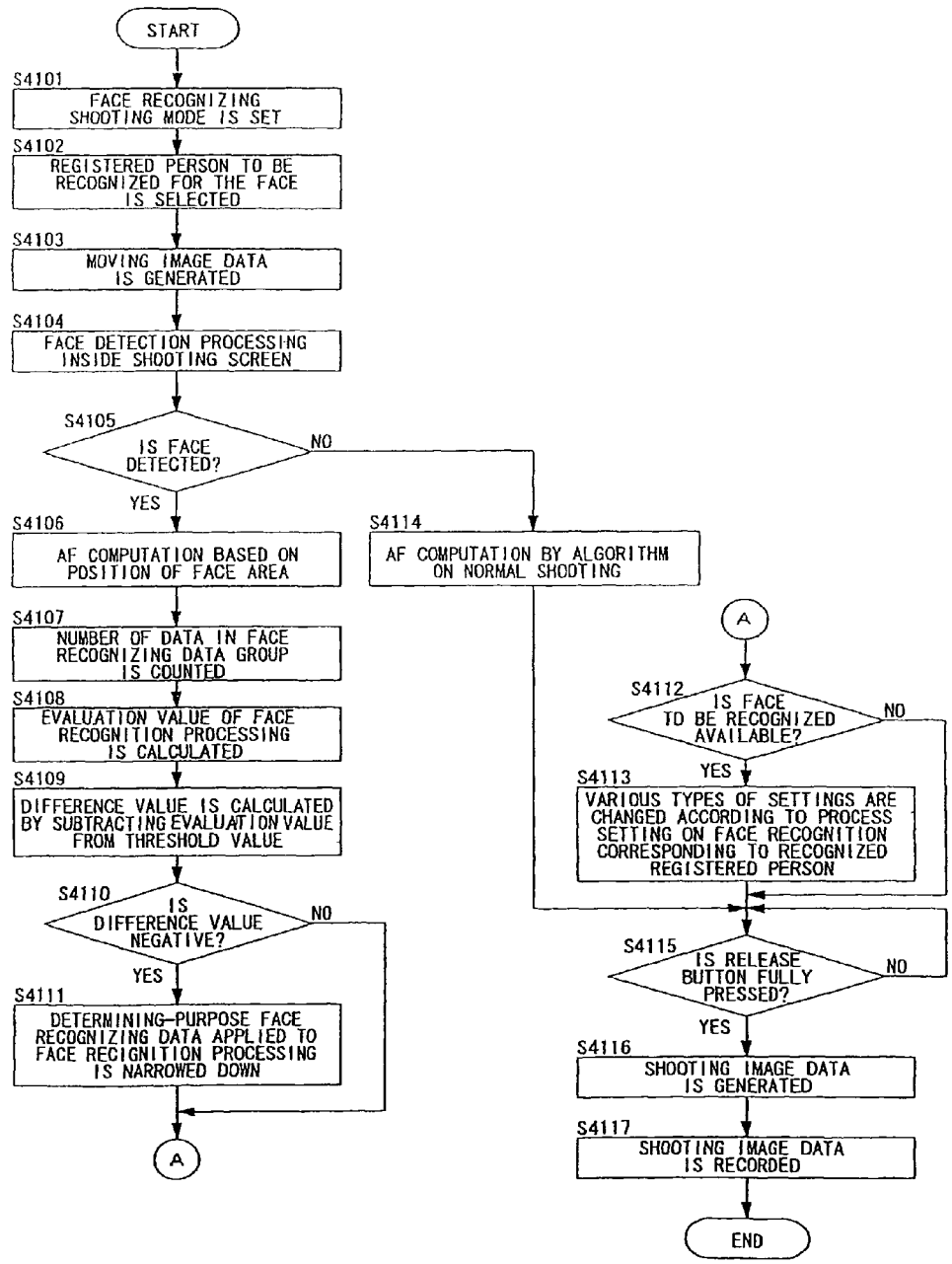
FIG. 19 is a flow chart showing the operations of Embodiment 7 in a "face recognizing shooting mode".

FIG. 19 is a flow chart showing the operations of the electronic camera of Embodiment 7 in the "face recognizing shooting mode." Embodiment 7 is an exemplified variation of Embodiment 1, and composition of the electronic camera is made up common to Embodiment 1, therefore, the explanation of which is omitted for avoiding overlapping description. Since S4101 to S4104 in FIG. 19 respectively correspond to S201 to S204 in FIG. 7, the explanation of which is omitted here.

Operation S4105: The CPU 26 determines in S4104 on a shooting screen whether the face is detected. Where the face is detected (where YES), the CPU 26 proceeds to S4106. On the other hand, where the face is not detected (where NO), the CPU 26 proceeds to S4114.

Operation S4106: The CPU 26 executes AF computation based on a position of the thus detected face area. In addition, where a plurality of face areas are detected, the CPU 26 executes the AF computation, with the priority given to a face area positioned at the center of the shooting screen or a face area in the closest proximity.

Operation S4107: The CPU 26 counts the number of all face recognizing data (face recognizing data group) with regard to registered persons to be recognized for the face. Specifically, in the face registration memory 27, face recognizing data, which has been recorded in a group folder of registered persons to be recognized for the face, is to be counted.

Operation S4108: The CPU 26 multiplies the number of face areas detected inside a shooting screen (S4104) by the number of face recognizing data included in the face recognizing data group (S4107) to obtain an evaluation value showing a maximum computation amount of the present face recognition processing. The evaluation value corresponds to a computation amount in a case where all the face recognizing data included in the face recognizing data group are applied to all the face areas detected this time to conduct the face recognition processing.

Operation S4109: The CPU 26 determines a difference value obtained by subtracting the evaluation value (S4108) from a predetermined threshold value. The threshold value is set based on a computation amount of the face recognition processing which the face recognizing section 32 can execute within a predetermined time limit. Therefore, a specific value of the threshold value varies depending on a computation capacity of the face recognizing section 32.

Operation S4110: The CPU 26 determines whether the difference value (S4109) is negative. Where the difference value is negative (where YES), the CPU 26 proceeds to S4111. On the other hand, where the difference value is 0 or greater (where NO), the CPU 26 proceeds to S4112. In addition, where NO in S4110, the face recognizing section 32 converts all the face recognizing data of the face recognizing data group into the determining-purpose face recognizing data.

Operation S4111: In this case, the evaluation value (S4108) is in excess of a threshold value, and when all the face recognizing data in the face recognizing data group are applied, it is more likely that the face recognition processing may not be completed within a time limit. Therefore, the CPU 26 narrows down the determining-purpose face recognizing data which will be applied for the present face recognition processing from the face recognizing data group.

Specifically, first, the CPU 26 computes an upper limit of the determining-purpose face recognizing data based on the above difference value (S4109). Next, the CPU 26 selects the determining-purpose face recognizing data from the face recognizing data group by using the following algorithms of (1) and (2) so as to be less than the upper limit.

(1) Where a plurality of registered persons to be recognized for the face are available, the CPU 26 sets an allocation number of the determining-purpose face recognizing data for each registered person based on the above upper limit. In principle, the CPU 26 sets the same allocation number to all the registered persons to be recognized for the face.

Alternatively, the CPU 26 may weight the allocation number based on a priority level set for each registered person so as to increase the number of determining-purpose face recognizing data in proportion to a higher priority level. In this case, to a registered person higher in priority level, applied is the face recognition processing based on more face recognizing data. Therefore, a registered person higher in priority level can be recognized for the face at higher accuracy. For example, the CPU 26 is able to set higher the priority level of a registered person who is greater in the number of shootings based on the data on the number of shootings in the face registration memory 27.

Further, the CPU 26 may compare the individual numbers of face recognizing data in each group folder so that a registered person having the number of face recognizing data greater than a predetermined value is given a higher allocation number. This is because the registered person having a greater registration number of face recognizing data is more likely to be a registered person whom a user desires to shoot by priority.

(2) The CPU 26 selects the determining-purpose face recognizing data from the face recognizing data in the group folder for each registered person to be recognized for the face within a range of the allocation number set in the above (1). In this case, where the face recognizing data in the group folder is less than an allocation number, the CPU 26 selects all the face recognizing data in the group folder as the determining-purpose face recognizing data. In this case, the CPU 26 may reallocate redundant allocation numbers to other registered persons.

On the other hand, where the face recognizing data in the group folder is in excess of an allocation number, the CPU 26 selects the determining-purpose face recognizing data according to any of the following criteria (or any combination of them).

First, the CPU 26 refers to data on "registration time of face recognizing data" in the group folder to select the determining-purpose face recognizing data in order of registration time from the newest. This is because the reliability of the face recognizing data on shooting may be decreased accordingly in order of registration time from the oldest.

Second, the CPU 26 refers to data on "shooting conditions on acquisition of face recognizing data" in the group folder. Then, the CPU 26 selects the determining-purpose face recognizing data from a plurality of face recognizing data, with priority given to the face recognizing data in which the above-described shooting conditions on acquisition are closer to the present shooting conditions. This is because the face recognizing data acquired under conditions closer to the present shooting conditions is more helpful in improving the accuracy of face recognition.

For example, a table is prepared in advance for expressing a variation of each parameter of shooting conditions by scores, and the CPU 26 determines scores of shooting conditions of the face recognizing data based on the present shooting conditions. Then, the CPU 26 compares the above scores to select the determining-purpose face recognizing data. Thereby, where flash is emitted on shooting, the CPU 26 selects the determining-purpose face recognizing data, with priority given to the face recognizing data having flash emission. On the other hand, where flash is not emitted on shooting, the CPU 26 selects the determining-purpose face recognizing data, with priority given to the face recognizing data having no flash emission. Similarly, the CPU 26 selects the determining-purpose face recognizing data, with priority given to the face recognizing data closer in exposure conditions and setting of white balance.

Third, the CPU 26 selects the determining-purpose face recognizing data, with priority given to the face recognizing data corresponding to the front of the face, among the face recognizing data in a group folder. This is because shooting are performed usually for a person who turns to the front. In this case, the direction of the face is detected in the face recognizing data as follows. For example, recognition information on the direction of the face may be in advance recorded in the face recognizing data so that the CPU 26 can determine the direction of the face by referring to the recognition information. Further, the CPU 26 may estimate the direction of the face by referring to an extracted state of feature points such as the eyes, nose, and mouth in the face recognizing data.

Operation S4112: The face recognizing section 32 of the CPU 26 applies face recognition processing based on the determining-purpose face recognizing data to a detected face area (S4104). Then, the face recognizing section 32 determines whether a face to be recognized is included (S4102). Where the face to be recognized is included (where YES), the CPU 26 proceeds to S4113. On the other hand, where the face to be recognized is not included (where NO), the CPU 26 proceeds to S4115.

Operation S4113: The CPU 26 changes a shooting setting condition for an electronic camera and a setting of image processing based on data on "processing setting on face recognition" corresponding to the thus detected registered person. Thereafter, the CPU 26 proceeds to S4115.

In this case, where the faces to be recognized are detected plurally inside a shooting screen, the CPU 26 decides a priority level of the registered person by referring to a predetermined algorithm. Then, the CPU 26 changes various types of settings of the electronic camera based on the "processing setting on face recognition" corresponding to a registered person highest in priority level. In addition, where a registered person is set to be shot automatically by the "processing setting on face recognition," the CPU 26 proceeds to S4116 and automatically shoots the registered person.

Operation S4114: On the other hand, in this case, the CPU 26 selects an AF area by referring to an algorithm on normal shooting in response to an operation in which the release button is half-pressed by a user, thereby executing AF computation.

Operation S4115: The CPU 26 determines whether the release button is fully pressed. Where the release button is fully pressed (where YES), the CPU 26 proceeds to S4116. On the other hand, where no input is given to the release button (where NO), the CPU 26 stands ready for an operation in which the release button is fully pressed.

Operation S4116: The CPU 26 drives the image sensor 16 to shoot a subject image. Thereafter, the image processing section 20 generates shooting image data based on an image signal at release.

In addition, where a registered person to be recognized for the face is shot, the image processing section 20 applies the image processing set by S4113 to the shooting image data.

Operation S4117: The CPU 26 records the shooting image data on a recording medium 29. Where the registered person to be recognized for the face is shot, the CPU 26 is able to classify the shooting image data into a predetermined record folder based on a directory path specified by the face registration memory 27 and record it.

Further, the CPU 26 increments the number of shootings of data on the number of shootings in the face registration memory 27 based on the result of face recognition in S4112. In this case, the CPU 26 may increment the number of shootings of all the registered persons who have been recognized or may increment the number of shootings of only the registered persons who have been selected according to a priority level. As described so far, a series of operations in the "face recognizing shooting mode" are completed.

Hereinafter, an explanation will be made for the effects of the present embodiment in a "face recognizing shooting mode." In the face recognizing shooting mode, a captured person is recognized for the face based on the face recognizing data (S4112). Then, where a face to be recognized is detected, various types of processing on shooting are performed in a setting corresponding to the registered person (S4113, S4116 and S4117). Therefore, it is possible to automatically conduct such a processing that reflects the intention of a user on shooting the registered person, greatly benefiting the user who uses an electronic camera in terms of convenience.

Further, in the above face recognizing shooting mode, where the face recognition processing is more likely not to be completed within a time limit, a predetermined algorithm is referred to narrow down the determining-purpose face recognizing data (S4107 to S4111).

Therefore, the face recognition processing can be completely computed within the time limit, thereby a user is able to perform the shooting under comfortable conditions.

(Supplementary Items of Embodiments)

(1) In the "face registration mode" of Embodiment 1 to Embodiment 3 as well, as with Embodiment 4, composition assisting display or shooting sample display may be synthesized and displayed in a preview image. Further, in the "face registration mode" described in Embodiment 4 as well, the face detection processing may be performed before release by the moving image data.

(2) In the above embodiments, the CPU 26 may be set to execute AF computation by face detection, with the half-pressed release button being used as a trigger.

(3) In the above embodiments, the "face registration mode" and the "face detecting shooting mode" may be directly specified by mode dial or the like to start up, as with the "normal shooting mode," the "portrait shooting mode" and the "regeneration mode."

(4) In the "face registration mode" of Embodiment 3, the CPU 26 may generate two or more pieces of the face recognizing data in order of a higher priority level.

(5) In the "face registration mode" of Embodiment 4, the CPU 26 may shoot face registration image data on the recording medium 29 or the like in an accumulated manner, thereby subjecting a plurality of face registration image data to batch processing to generate face recognizing data all at once. In this case, as with Embodiment 3, a priority level may be set to the face registration image data to generate the face recognizing data in order of a higher priority level.

(6) Any data showing a rough idea on when original face registration image data has been shot will suffice for the data on "registration time of face recognizing data" in the face registration memory. Therefore, the "registration time of face recognizing data" may be sufficient, if it includes any one of shooting year, shooting month and shooting day, with records such as exact time omitted.

(7) When the face recognition processing (S207) is conducted in the "face recognizing shooting mode," the face recognizing section 32 may narrow down the face recognizing data used in determination among grouped face recognizing data by referring to predetermined conditions. For example, the face recognizing section 32 may exclude the face recognizing data, which is older than the shooting date and hour by a certain period or longer, based on the "registration time of face recognizing data." Similarly, the face recognizing section 32 may exclude the face recognizing data, which has been generated under shooting conditions greatly different from the present shooting conditions based on the "shooting conditions on acquisition of face recognizing data."

(8) When the face recognition processing (S207) is conducted in the "face recognizing shooting mode," the face recognizing section 32 may correct the face recognizing data according to the extent of distortion computed from the data of focal length of a shooting optical system 11.

(9) In the "face registration mode," the CPU 26 may generate recognizing information on the direction of the face in the face recognizing data to record the recognizing information in the face registration memory 27. The CPU 26 may generate the recognizing information in the direction of the face based on the result of the processing shown in S110 in Embodiment 1. Alternatively, the CPU 26 may generate the recognizing information based on input by a user on shooting or editing.

(10) It is not always necessary that the electronic camera of the present invention is identical in constitution to the electronic camera of the embodiments. For example, the built-in memory 19 and the face registration memory 27 may be made up of a common memory. The face registration memory 27 may be coupled to the CPU 26 via the data bus 28. Further, an optical image blurring correcting mechanism made up of the sway sensor section 13, the image blurring correcting lens 14 and the second lens driving section 15 may be omitted. Still further, the communication unit 30 may be internally installed inside the electronic camera.

(11) The CPU 26 may record the data inside the face registration memory 27 on a recording medium 29, thereby creating backup copies of the face registration memory 27. Further, the CPU 26 may acquire face recognizing data or the like generated in advance by other electronic cameras from recording medium 29 to use the data in the face registration memory 27 commonly between the electronic cameras.

(12) The image processing device of the present invention is not limited in the constitution to the electronic camera of Embodiment 5. For example, the image processing device of the present invention may be made up of a personal computer or the like, which is provided with a unit for reading image data externally, a recording section for recording face recognizing data and a controlling section for executing a program of the above "face registration mode" (not illustrated).

(13) On start-up operation of an edit screen in Embodiment 6, the CPU 26 may carry out personal authentification based on face authentication and personal authentification by inputting a password. In this case, the CPU 26 may have access to the edit screen when authentification either by the face authentication or by the password is successful. Further, the CPU 26 may have access to the edit screen only when authentification both by the face authentication and by the password is successful.

(14) The constitution of the edit screen given in Embodiment 6 is shown just as one example. For example, there may be a constitution in which the "selecting screen of registered person" is not provided but display items for face recognizing data are shown on an initial display screen of the edit screen in an enlisted manner, together with a face registration image.

(15) In Embodiment 6, any given shooting image of a registered person may be used as an index image displayed on the "selecting screen of registered person." For example, the CPU 26 may display an image especially shot for the index image on the "selecting screen of registered person." Further, the CPU 26 may display on the "selecting screen of registered person" a face registration image corresponding to face recognizing data which has already been deleted.

(16) When the face recognition processing (S4112) is conducted in the "face recognizing shooting mode" of Embodiment 7, the face recognizing section 32 may correct the face recognizing data according to the extent of distortion computed from the data on focal length of the shooting optical system 11.

(17) In Embodiment 7, the determining-purpose face recognizing data is selected from the face recognizing data group based on the number of the face recognizing data and the number of the face areas. However, in the present invention, the determining-purpose face recognizing data may be appropriately selected from the face recognizing data group only based on the number of face recognizing data on the thus selected registered persons, with no consideration given to the number of detected face areas.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resort to, falling within the scope thereof.

The invention claimed is:

1. An electronic camera comprising:
   an image sensor which photoelectrically converts a subject image obtained by a shooting optical system to generate an image signal;
   an image processing section which generates face registration image data based on said image signal from said image sensor and generates moving image data based on said image signal;
   a face detecting section which detects a face area inside a shooting screen based on said moving image data;
   a controlling section which adjusts shooting parameters of said shooting optical system, depending on a position detected at said face area;
   one of a face image generating section which cuts out an image of said face area to generate face image data and a face recognizing data generating section which extracts feature points of the face of a captured person from a part of the face area of said face registration image data to generate face recognizing data based on said feature points; and a recording section which records one of said face image data and said face recognizing data, wherein said controlling section estimates an expression of a captured person based on a state of detecting said face area and disables the release operation of said image sensor depending on the type of expression.

2. The electronic camera according to claim 1, wherein said controlling section executes a release operation of said image sensor when the face is detected based on said moving image data.

3. The electronic camera according to claim 1, further comprising a display section displaying an image of said moving image data, wherein said controlling section turns on power of said display section in a shooting mode generating said face registration image data.

4. The electronic camera according to claim 1, further comprising a display section displaying an image of said moving image data wherein said image processing section synthesizes a composition assisting display assisting the positioning of the face in the shooting screen and outputs the composition assisting display at the central part of said moving image data.

5. The electronic camera according to claim 4, wherein said image processing section further synthesizes and outputs a sample display of a subject in a state of shooting into said moving image data.

6. The electronic camera according to claim 1, wherein said controlling section restricts a digital zoom processing with respect to said face registration image data on generation of said face registration image data.

7. The electronic camera according to claim 1, wherein said shooting optical system further includes a zoom lens, and said controlling section restricts a magnifying power adjustable range of said zoom lens on adjustment of said shooting parameters and at release more than on normal shooting.

8. The electronic camera according to claim 7, wherein said controlling section sets a zoom position of said zoom lens to a wide-angle end at release.

9. The electronic camera according to claim 1, further comprising:
an image blurring correcting lens which corrects image blurring on a shooting screen;
an angular displacement detecting section which detects change in the angle of the optical axis of said electronic camera; and
a correcting lens driving section which drives said image blurring correcting lens based on said change in the angle at release.

10. The electronic camera according to claim 1, further comprising an image sensitivity modification section adjusting gain of said image signal, wherein said controlling section makes greater the gain of said image signal at release than when it is set on normal shooting.

11. The electronic camera according to claim 1, further comprising a flash emitting section which emits flash to a field, wherein said controlling section disables the flash emission by said flash emitting section at release.

12. The electronic camera according to claim 1, wherein said controlling section generates shooting condition data which indicates shooting conditions at release and records the shooting condition data at said recording section by allowing the data to correspond to one of said face image data and said face recognizing data.

13. The electronic camera according to claim 1, wherein said controlling section generates acquisition time data which indicates time of acquiring one of said face image data and said face recognizing data and additionally records the acquisition time data at said recording section by allowing the data to correspond to one of said face image data and said face recognizing data.

14. The electronic camera according to claim 1, wherein said image processing section generates index image data based on said face registration image data, and said controlling section records said index image data at said recording section by allowing the data to correspond to one of said face image data and said face recognizing data.

15. The electronic camera according to claim 1, wherein said controlling section groups one of a plurality of said face image data and a plurality of said face recognizing data generated from the same captured person and records the thus grouped data at said recording section.

16. The electronic camera according to claim 15, wherein said controlling section groups two or more pieces of one of said face image data and said face recognizing data different in any one of the direction of the face of a captured person, the presence or absence of glasses of said captured person and shooting conditions of said face registration image data.

17. The electronic camera according to claim 1, wherein said controlling section decides a priority level of said face registration image data based on a state of detecting said face area when a plurality of said face registration image data obtained from the same captured person are generated, and one of said face image generating section and said face recognizing data generating section generates one of said face image data and said face recognizing data from said face registration image data higher in said priority level.

18. The electronic camera according to claim 1, wherein said controlling section estimates the direction of the face of a captured person based on a state of detecting said face area and disables the release operation of said image sensor when the direction of the face is not in agreement with a predetermined direction.

19. An electronic camera comprising:
an image sensor which photoelectrically converts a subject image obtained by a shooting optical system to generate an image signal;
a face detecting section which detects a face area inside a shooting screen based on said image signal from said image sensor;
a face recognizing data generating section which extracts feature points of the face of a captured person from a part of said face area to generate face recognizing data based on said feature points; and
a controlling section which estimates an expression of a captured person based on a state of detecting said face area and disables the release operation of said image sensor depending on the type of expression.

20. An image processing device comprising:
a controlling section which includes at least any one of a built-in memory, a connecting section with a recording medium and an external communication unit, thereby acquiring shooting image data previously generated by an electronic camera through any one of said built-in memory, said recording medium and a computer coupled via said external communication unit;

a face detecting section which detects a face area inside a shooting screen based on said shooting image data;

one of a face image generating section which cuts out an image of said face area to generate face image data and a face recognizing data generating section which extracts feature points of the face of a captured person from a part of the face area of said shooting image data to generate face recognizing data based on said feature points;

a recording section which records one of said face image data and said face recognizing data; and an input section accepting input by a user, wherein said face detecting section changes a threshold value which specifies a detection accuracy of said face area based on input from said input section.

21. The image processing device according to claim 20, further comprising:

an image processing section which synthesizes a display recognizing said face area in a reproduced image of said shooting image data; and a display section which displays an output image of said image processing section.

22. The image processing device according to claim 21, wherein one of said face image generating section and said face recognizing data generating section generates one of said face image data and said face recognizing data on a face area selected by input from said input section when a plurality of face areas are detected from said shooting image data.

23. The image processing device according to claim 20, wherein said controlling section groups one of a plurality of said face image data and a plurality of said face recognizing data generated from the same captured person and records the thus grouped data at said recording section.

24. The image processing device according to claim 20, wherein said controlling section cuts out a part of the face area of said shooting image data into a predetermined size to generate index image data and records the index image data at said recording section by allowing the data to correspond to one of said face image data and said face recognizing data.

25. The image processing device according to claim 20, wherein said shooting image data has an attachment data area at which shooting conditions on shooting are recorded, and said controlling section generates shooting condition data based on the shooting conditions of said attachment data area and records the shooting condition data at said recording section by allowing the data to correspond to one of said face image data and said face recognizing data.

26. The image processing device according to claim 20, wherein said shooting image data has an attachment data area at which shooting date and hour are recorded, and said controlling section generates acquisition time data of one of said face image data and said face recognizing data based on the shooting date and hour of said attachment data area and records the acquisition time data at said recording section by allowing the data to correspond to one of said face image data and said face recognizing data.

27. An electronic camera comprising:

an image sensor which photoelectrically converts a subject image obtained by a shooting optical system to generate an image signal;

a face detecting section which detects a face area of a shooting screen based on said image signal to extract feature points of the face of a captured person from a part of the face area;

a recording section which allows face recognizing data previously generated based on feature points of the face of a person to correspond to index image data indicating a registered person corresponding to the face recognizing data and records them;

a face recognizing section which determines whether said captured person is said registered person based on the feature points extracted by said face detecting section and said face recognizing data;

a controlling section which generates an edit screen relating a display item used in specifying said face recognizing data with an image of said index image data and showing the result; and a communicating section transmitting image data of a shooting image externally, wherein determination on whether said image data is transmitted in shooting of said registered person and address information on a destination of said image data are recorded at said recording section in a state where they are allowed to correspond to said face recognizing data.

28. The electronic camera according to claim 27, wherein said index image data is the shooting image data of said registered person.

29. The electronic camera according to claim 28, wherein said index image data is shooting image data used in generating said face recognizing data.

30. The electronic camera according to claim 28, wherein a plurality of said index image data with regard to the same registered person may be recorded at said recording section, and said controlling section selects an image of any given shooting image data from said index image data and relates the selected image with said display item to show results on said edit screen.

31. The electronic camera according to claim 30, wherein said controlling section selects an image of newest shooting image data from among said index image data.

32. The electronic camera according to claim 30, wherein said controlling section selects an image of shooting image data on the front of the face of said registered person from among said index image data.

33. The electronic camera according to claim 30, wherein said controlling section sequentially switches an image of said index image data at every predetermined time interval to show the image on said edit screen.

34. The electronic camera according to claim 27, wherein shooting conditions of image data used in generating said face recognizing data are recorded at said recording section in a state where they are allowed to correspond to said face recognizing data.

35. The electronic camera according to claim 27, wherein the shooting time of image data used in generating said face recognizing data is recorded at said recording section in a state where the shooting time is allowed to correspond to said face recognizing data.

36. The electronic camera according to claim 27, wherein process setting applicable in shooting of said registered person is recorded at said recording section in a state where the setting is allowed to correspond to said face recognizing data.

37. The electronic camera according to claim 27, wherein said controlling section includes a personal authentication unit managing determination on whether said edit screen is displayed and output.

38. The electronic camera according to claim 37, wherein said personal authentication unit includes face authentication by said face recognizing section.

39. An electronic camera comprising:
an image sensor which photoelectrically converts a subject image obtained by a shooting optical system to generate an image signal;
a face detecting section which detects a face area of a shooting screen based on said image signal to extract feature points of the face of a captured person from a part of the face area;
a recording section which allows face recognizing data previously generated based on feature points of the face of a registered person to correspond to shooting setting applicable in shooting of said registered person and records the data;
a face recognizing section which determines whether said captured person is said registered person based on feature points extracted by said face detecting section and said face recognizing data; and
a controlling section which sets a priority level of said registered person and generates shooting image data based on said shooting setting in shooting of said registered person, thereby applying said shooting setting corresponding to a person having the highest priority level among said registered persons on detection of a plurality of said registered persons.

40. The electronic camera according to claim 39, further comprising an input section accepting input by a user, wherein said controlling section specifies said registered person based on input from said input section to set said priority level individually.

41. The electronic camera according to claim 40, further comprising a display section displaying an edit screen on which said registered person is specified, wherein said controlling section allows one of a position and an order of displaying a display item of said registered person on said edit screen to change according to said priority level.

42. The electronic camera according to claim 39, wherein said controlling section sets said priority level in order of the registration of said registered persons.

43. The electronic camera according to claim 39, wherein said controlling section arranges said registered persons according to the names to set said priority level.

44. The electronic camera according to claim 39, wherein said recording section is able to group a plurality of said face recognizing data with regard to the same registered person and record the thus grouped data, and
said controlling section sets said priority level to the grouped face recognizing data group according to the number of said face recognizing data included in the face recognizing data group.

45. The electronic camera according to claim 39, wherein said recording section further records data on the number of shootings indicating the number of shootings for each of said registered persons, and
said controlling section sets higher said priority level of a registered person having a greater number of shootings based on said data on the number of shootings.

46. An electronic camera comprising:
an image sensor which photoelectrically converts a subject image obtained by a shooting optical system to generate an image signal;
a face detecting section which detects a face area of a shooting screen based on said image signal to extract feature points of the face of a captured person from a part of the face area;
a recording section which records face recognizing data previously generated based on feature points of the face of a registered person;
a controlling section which selects determining-purpose face recognizing data from said face recognizing data group based on the number of said face recognizing data included in the face recognizing data group with regard to a registered person to be recognized for the face; and
a face recognizing section which determines whether said captured person is the registered person to be recognized for the face based on feature points extracted by said face detecting section and said determining-purpose face recognizing data.

47. The electronic camera according to claim 46, wherein said controlling section selects said determining-purpose face recognizing data in such a manner that an evaluation value corresponding to a product of the number of said face recognizing data and the number of said face areas is below a threshold value specified by the processing capacity of said face recognizing section.

48. The electronic camera according to claim 46, wherein said controlling section weights and selects said determining-purpose face recognizing data based on a priority level set for each registered person where a plurality of registered persons to be recognized for the face are available.

49. The electronic camera according to claim 46, wherein said controlling section selects said determining-purpose face recognizing data, with priority given to a registered person having a greater number of said face recognizing data where a plurality of registered persons to be recognized for the face are available.

50. The electronic camera according to claim 46, wherein said controlling section selects said determining-purpose face recognizing data, with priority given to face recognizing data newer in acquisition time where a plurality of said face recognizing data are recorded with regard to the same registered person.

51. The electronic camera according to claim 46, wherein said controlling section selects said determining-purpose face recognizing data, with priority given to face recognizing data which shooting conditions on said acquisition are similar to the present shooting conditions where a plurality of said face recognizing data differ in shooting conditions on acquisition with regard to the same registered person are recorded.

52. The electronic camera according to claim 46, wherein said controlling section selects said determining-purpose face recognizing data, with priority given to face recognizing data corresponding to the front of the face where a plurality of said face recognizing data differ in the direction of the face with regard to the same registered person are recorded.

53. The electronic camera according to claim 46, wherein said recording section further records data of the number of shootings indicating the number of shootings for each of said registered persons, and
said controlling section selects said determining-purpose face recognizing data, with priority given to a registered person greater in the number of shootings based on said data of the number of shootings.

* * * * *